United States Patent
Place

(10) Patent No.: US 12,209,719 B2
(45) Date of Patent: Jan. 28, 2025

(54) OPTICAL ELEMENTS AND SYSTEMS FOR REFLECTING DIRECT BEAM SUNLIGHT WHILE ADMITTING DIFFUSE SKYLIGHT THROUGH BUILDING APERTURES

(71) Applicant: North Carolina State University, Raleigh, NC (US)

(72) Inventor: Jeffrey Wayne Place, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 18/007,130

(22) PCT Filed: Jul. 27, 2021

(86) PCT No.: PCT/US2021/070997
§ 371 (c)(1),
(2) Date: Jan. 27, 2023

(87) PCT Pub. No.: WO2022/027025
PCT Pub. Date: Feb. 3, 2022

(65) Prior Publication Data
US 2023/0228393 A1    Jul. 20, 2023

Related U.S. Application Data

(60) Provisional application No. 63/057,281, filed on Jul. 27, 2020.

(51) Int. Cl.
F21S 11/00    (2006.01)
E04D 13/03    (2006.01)
(Continued)

(52) U.S. Cl.
CPC .......... *F21S 11/005* (2013.01); *E04D 13/033* (2013.01); *E04D 13/0354* (2013.01);
(Continued)

(58) Field of Classification Search
CPC ..... F21S 11/005; F21S 11/007; E04D 13/033; E04D 13/035; E06B 2009/2417
(Continued)

(56) References Cited

U.S. PATENT DOCUMENTS

| 4,260,220 A | 4/1981 | Whitehead |
| 4,509,825 A | 4/1985 | Otto et al. |

(Continued)

FOREIGN PATENT DOCUMENTS

| CN | 111442237 | 7/2020 |
| DE | 1180695 B | 11/1964 |

(Continued)

OTHER PUBLICATIONS

International Search Report for PCT/US2021/070997 mailed Dec. 2, 2021.
(Continued)

*Primary Examiner* — Christopher E Mahoney
(74) *Attorney, Agent, or Firm* — Thomas | Horstemeyer, LLP

(57) ABSTRACT

Optical elements and systems are disclosed that can be incorporated into buildings to prevent beam sunlight from entering through apertures of the building while allowing diffuse skylight to enter the building through the apertures. The optical system comprises optical elements configured to admit diffuse skylight through an aperture in the building envelope, while reflecting away the beam sunlight incident on the aperture in the building envelope. The apertures can be, for example, windows in walls or skylights in roofs of the building envelope. The optical system works for both windows in the walls and skylights in the roof, with somewhat different configurations for those two parts of the building envelope.

20 Claims, 24 Drawing Sheets

(51) Int. Cl.
  *E04D 13/035* (2006.01)
  *E06B 9/24* (2006.01)
  *F21V 5/02* (2006.01)

(52) U.S. Cl.
  CPC ............ *E04D 13/0357* (2013.01); *E06B 9/24* (2013.01); *F21V 5/02* (2013.01); *E06B 2009/2417* (2013.01)

(58) Field of Classification Search
  USPC .................................................. 359/591–593
  See application file for complete search history.

(56) References Cited

U.S. PATENT DOCUMENTS

| | | | |
|---|---|---|---|
| 5,729,387 A | 3/1998 | Takahashi et al. | |
| 9,127,823 B2 | 9/2015 | Jaster | |
| 9,322,178 B2 | 4/2016 | Kastner et al. | |
| 2008/0291541 A1* | 11/2008 | Padiyath | G02B 5/0205 |
| | | | 359/569 |
| 2010/0269426 A1* | 10/2010 | Richter | E06B 7/12 |
| | | | 52/204.593 |
| 2013/0192770 A1* | 8/2013 | Murphy, Jr. | E04F 10/10 |
| | | | 160/5 |
| 2019/0113196 A1 | 4/2019 | Ymbern | |

FOREIGN PATENT DOCUMENTS

| | | |
|---|---|---|
| GB | 2425134 A | 10/2006 |
| JP | 2000075238 A * | 3/2000 |

OTHER PUBLICATIONS

W. Place, M. Salamati, J. Hu, Innovative Daylight Structures for Airport Terminal and Concourse Buildings, presented at the International Conference on Structures and Architecture (ICSA), in Lisbon, Portugal, Jul. 24-26, 2019.

International Search Report for EP 21850234.2 mailed Jun. 20, 2024.

* cited by examiner

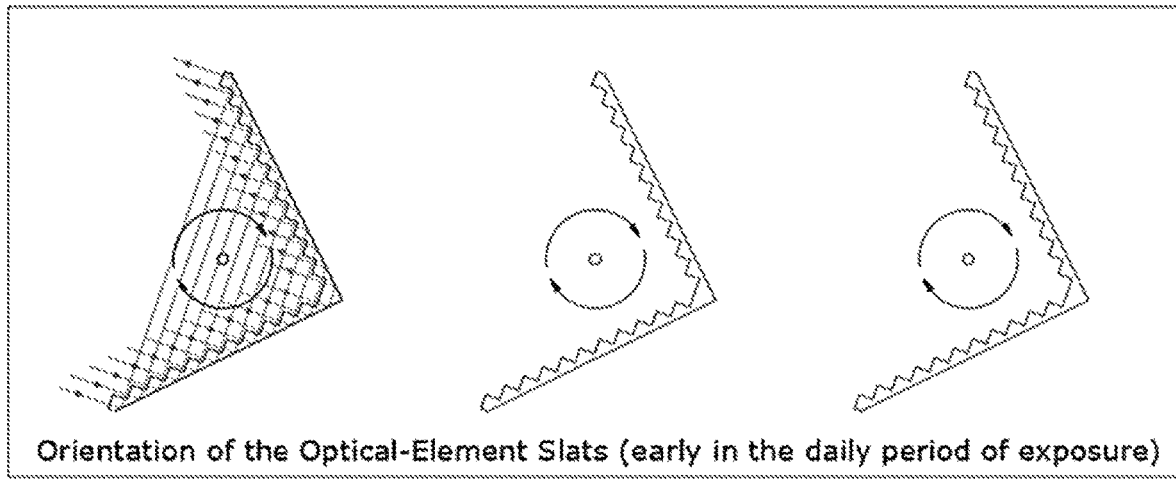
Orientation of the Optical-Element Slats (early in the daily period of exposure)
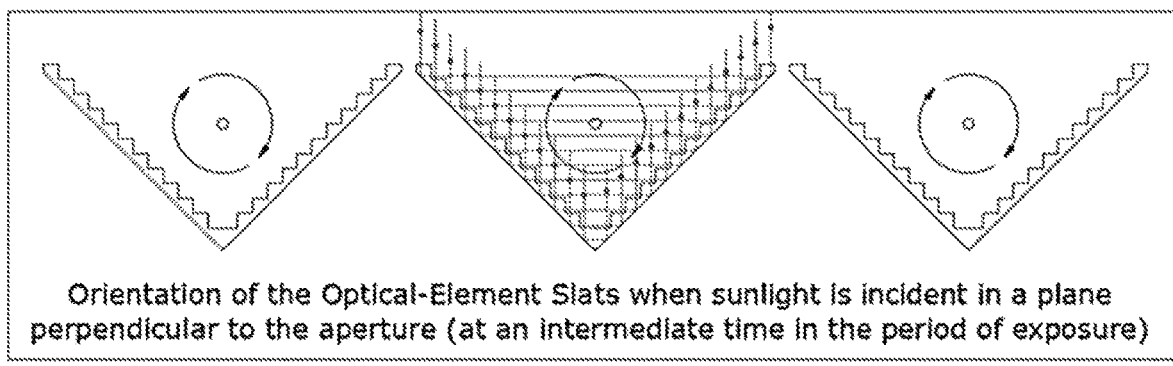
Orientation of the Optical-Element Slats when sunlight is incident in a plane perpendicular to the aperture (at an intermediate time in the period of exposure)
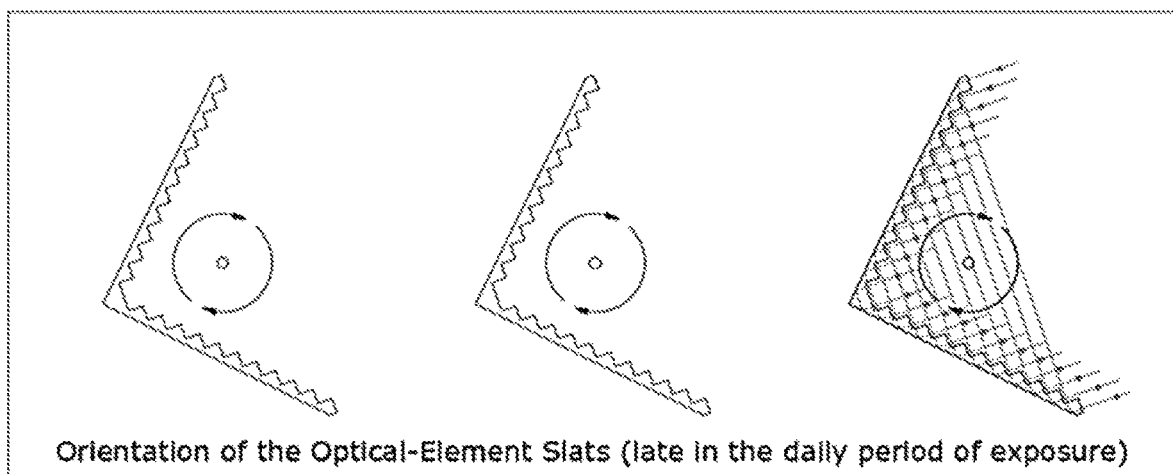
Orientation of the Optical-Element Slats (late in the daily period of exposure)
FIG. 15B

OPTICAL ELEMENTS AND SYSTEMS FOR REFLECTING DIRECT BEAM SUNLIGHT WHILE ADMITTING DIFFUSE SKYLIGHT THROUGH BUILDING APERTURES

CROSS REFERENCE TO RELATED APPLICATIONS

This application is the 35 U.S.C. § 371 national stage application of PCT Application No. PCT/US2021/070997, filed Jul. 27, 2021, which claims priority to, and the benefit of, U.S. provisional application entitled "Optical Elements And Systems For Reflecting Direct Beam Sunlight While Admitting Diffuse Skylight Through Building Apertures" having Ser. No. 63/057,281, filed Jul. 27, 2020, both of which are hereby incorporated by reference herein in their entireties.

TECHNICAL FIELD

The present disclosure is directed to elements and systems for reflecting direct beam sunlight while admitting diffuse skylight through building apertures.

BACKGROUND

Daylight can be defined as the combination of direct beam sunlight, referred to herein as "beam sunlight," and diffuse, or scattered, skylight. Daylight can provide useful illumination in the interiors of buildings and, when designed properly, can be effective in offsetting lighting electricity consumption. In addition to facilitating visual functions, daylight has a direct impact on the physical and psychological well-being of human beings. Literature reveals that daylight can trigger the human body to produce vitamin D and various other hormones. It also brings about stimulation of circadian physiology and cognitive performance, reduction of depression and stress, and improvement of vision. Despite all of these advantages, most people spend most of their time inside buildings that do not provide a good quantity and quality of daylight. Therefore, configuring buildings to admit ample quantities of natural lighting into the building interiors is generally a desirable design strategy.

Among the challenges in using daylight to illuminate building interiors, are the following:

- Beam sunlight can cause extreme thermal overload if admitted to the building during the cooling season.
- Beam sunlight can cause thermal discomfort for building occupants close to the apertures admitting the beam sunlight.
- Beam sunlight that is admitted directly into the building can hit occupants in the eye, causing disabling glare.
- Beam sunlight can be blocked from hitting the occupants in the eyes by intercepting it and diffusing it around the interior space by using diffusing glazing in the aperture. However, diffusing the beam sunlight does not reduce the energy content of the radiation and does not reduce the thermal overload.
- Diffusing the beam sunlight can still cause glare due to the extreme luminosity of the diffusing glazing.
- If the transmissivity of the diffusing glazing is reduced sufficiently to solve the thermal overload and the glare, then it will not admit enough light when there is only diffuse skylight and no beam sunlight available.
- The illuminance level in the interior space can change drastically as clouds alternately block and then unblock the beam sunlight, which:
  - can cause adaptation glare for the occupants.
  - require expensive, adaptive electric lighting to keep the illumination at the target level.

Because of all these problems with beam sunlight, the preferred natural lighting source is diffuse skylight, which has a tolerable luminosity and tends to be steady over time, so it does not create glare or adaptation challenges. Diffuse skylight is also omnidirectional, so it tends to distribute itself more uniformly over the interior space.

A need exists for elements and systems that can be incorporated into buildings that prevent beam sunlight from entering through apertures of the building while allowing diffuse skylight to enter the building through the apertures.

SUMMARY

An optical system for reflecting direct beam sunlight while admitting diffuse skylight through building apertures is disclosed in the present disclosure. The optical system is configured to be secured to a building aperture. the optical system comprises at least a first optical element and a rotation-imparting mechanism. The optical element(s) comprises at least a first sheet of optically transmissive material. The sheet(s) has at least a first side and a second side, the first side facing away from the building and the second side facing an interior of the building. The second side has at least a first set of optical features formed therein that are designed to reflect beam sunlight while passing diffusive light when the optical element(s) is in a first orientation relative to the Sun. The rotation-imparting mechanism is mechanically coupled to the optical element(s) and imparts rotational motion to the optical element(s) to cause the optical element(s) to track the Sun and remain in the first orientation relative to the Sun such that rays of beam sunlight are incident on the optical features of the first set of optical features at a preselected angle of incidence that results in the optical features reflecting the rays of beam sunlight while passing the diffuse light.

In accordance with an embodiment, the optical features comprise an array of serrations formed in the second side and extending in a lengthwise direction that is substantially parallel to a plane in which the rays of beam sunlight propagate.

In accordance with an embodiment, each serration has first and second inner sides that are at a preselected angle to one another. In accordance with an embodiment, the preselected angle ranges between about 30° and about 60°. In accordance with an embodiment, the preselected angle is about 45° such that the rays of beam sunlight experience total or nearly total internal reflection when the rays of beam sunlight encounter the first and second inner sides of the serrations.

In accordance with an embodiment, the first side of the first sheet is substantially flat. In accordance with an embodiment, the first sheet is divided into alternating offset strips of optical elements, with adjacent strips have vertical voids that are absent of the optical features such that diffuse light passes through the vertical voids. In accordance with an embodiment, the vertical voids are covered with vertical sheets of optically transmissive material. Diffuse light passes through the vertical sheets.

In accordance with an embodiment, the optical system further comprises an internal glazing surface that is coupled to the vertical sheets such that still air is encapsulated in between the internal glazing surface, the vertical sheets and at least one of the first and second sides of the first sheet.

In accordance with an embodiment, the optical system further comprises an exterior glazing surface.

In accordance with an embodiment, the optical system further comprises an interior glazing surface.

In accordance with an embodiment, a least one of the interior and exterior glazing surfaces is curved.

In accordance with an embodiment, the first sheet is curved.

In accordance with an embodiment, the optical element(s) is rotated by the rotation-imparting mechanism about an axis that is perpendicular to the first sheet and located at a center of said at least a first optical element.

In accordance with an embodiment, the optical element(s) is a circular optical element and the building aperture is a circular aperture. The circular optical element fully protects the circular aperture against all incoming beam sunlight.

In accordance with an embodiment, the optical element(s) is a circular optical element and the building aperture is a non-circular aperture. The circular optical element partially protects the non-circular aperture against incoming beam sunlight, while allowing beam sunlight to penetrate through unprotected parts of the non-circular aperture lying outside the circular optical element.

In accordance with an embodiment, the optical system further comprises one or more surfaces for a low-E coating to help suppress thermal radiation transfer through the a glazing assembly of the building aperture.

In accordance with an embodiment, the rotation-imparting mechanism is controlled to admit at least some amounts of beam sunlight into the interior of the building.

In accordance with an embodiment, the optical element(s) works in conjunction with the external glazing surface to seal the building aperture and to encapsulate a still layer of air or other insulating gas to enhance a thermal integrity of the building aperture.

In accordance with an embodiment, the optical element(s) works in conjunction with the internal glazing surface to seal the building aperture and to encapsulate a still layer of air or other insulating gas to enhance a thermal integrity of the building aperture.

In accordance with an embodiment, the interior glazing surface is a flat surface.

In accordance with an embodiment, the interior glazing surface is a curved surface having prismatic or diffusing elements formed therein for dispersing diffusive light around the interior of the building.

In accordance with an embodiment, the interior and exterior glazing surfaces are curved surfaces and the optical element has a domical geometry.

In accordance with an embodiment, the optical system comprises an optical-element sunshade system comprising a plurality of optical elements coupled to separate mounts that are rotated by the rotation-imparting mechanism.

In accordance with an embodiment, the optical-element sunshade system comprises a plurality of highly reflective surfaces, where adjacent highly reflective surfaces are separated from one another by daylight apertures that are covered with insulated glazing surfaces. Diffuse skylight that is not incident on the optical elements passes through the insulated glazing and through the daylight apertures into the interior of the building. Beam sunlight that that is not incident on the optical elements is incident on the highly reflective surfaces and is reflected by the highly reflective surfaces.

In accordance with an embodiment, the optical system further comprises a protective exterior and is configured to be installed on a ceiling of the building.

In accordance with an embodiment, the optical-element sunshade system is configured for a circular aperture, and the rotation-imparting mechanism comprises an Equatorial Mount for adjusting the location of the optical-element sunshade system to shade the building aperture and to adjust the orientation of the optical-element sunshade system relative to the Sun based on the time of the year so that a normal to a plane of the optical-element sunshade system points toward the Sun.

In accordance with an embodiment, the optical-element sunshade system slides along an Arc Beam to account for seasonal changes in the position of the Sun and rotates about an axis parallel to the Earth's rotational axis to account for diurnal changes in the position of the Sun.

In accordance with an embodiment, the rotation-imparting mechanism comprises an Altitude-Azimuth mount.

In accordance with an embodiment, the optical system comprises an array of parallel optical-element slats, each slat comprising a plurality of the optical elements having serrations on one side. A long dimension of the optical-element slats is parallel to the serrations, and each slat is able to rotate about an axis parallel to the serrations.

These and other features and advantages will become apparent from the following description, drawings and claims.

BRIEF DESCRIPTION OF THE DRAWINGS

FIG. 1B depicts the manner in which the serrations reflect beam sunlight; FIG. 1C depicts the manner in which the flat surface and the serrated surface pass diffuse skylight.

FIG. 15B shows the optical behavior of the optical system shown in FIG. 15A.

DETAILED DESCRIPTION

Figure 1A:
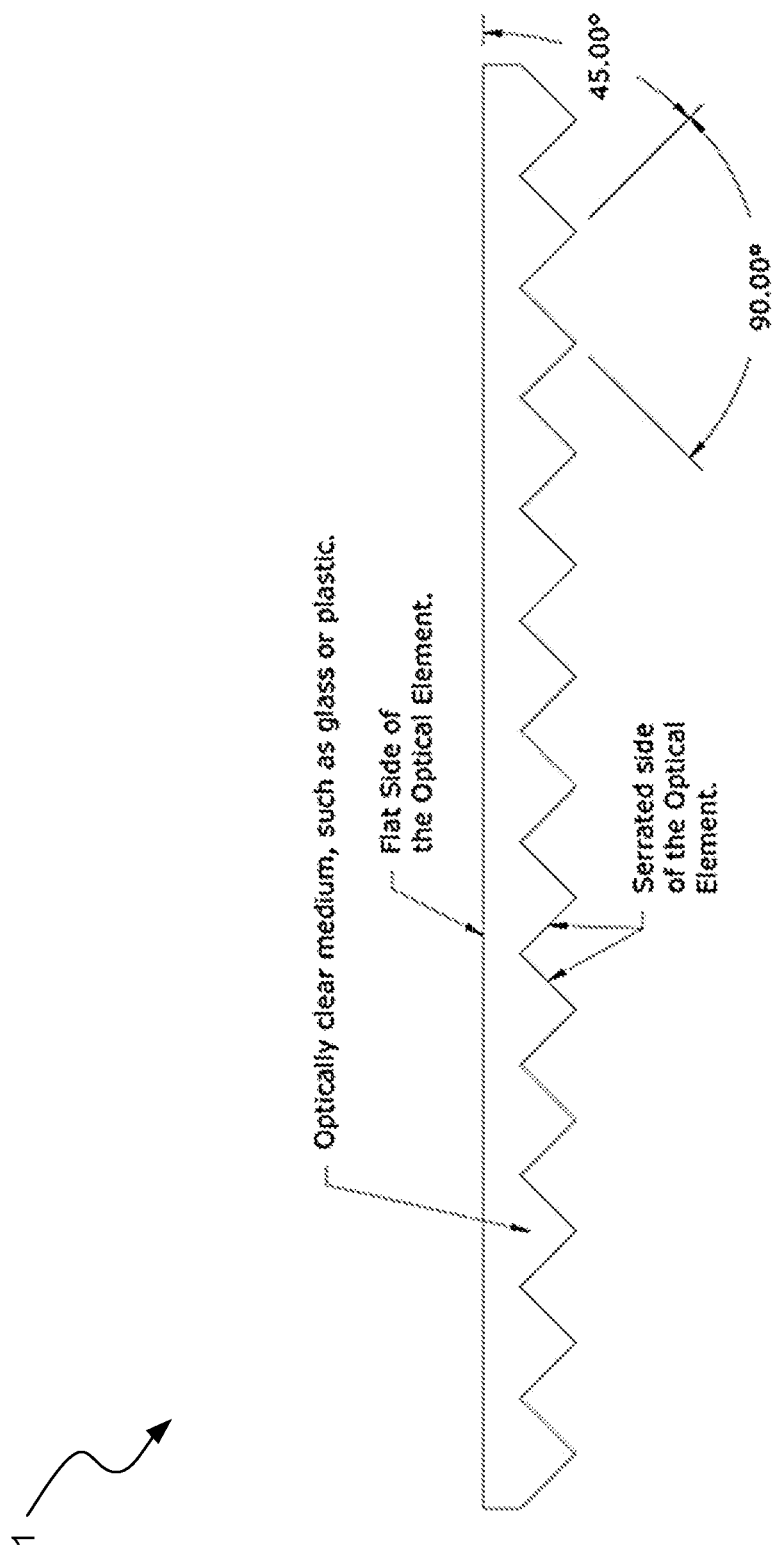
FIGS. 1A-1C are top cross-sectional views of an optical element in accordance with a representative embodiment that can be incorporated into an aperture of a building envelope.

Optical elements and systems are disclosed in the present disclosure that can be incorporated into buildings to prevent beam sunlight from entering through apertures of the building while allowing diffuse skylight to enter the building through the apertures. The optical system comprises optical elements configured to admit diffuse skylight through an aperture in the building envelope, while reflecting away the beam sunlight incident on the aperture in the building envelope. The apertures can be, for example, windows in walls or skylights in roofs of the building envelope. The optical system works for both windows in the walls and skylights in the roof, with somewhat different configurations for those two parts of the building envelope.

In the following detailed description, for purposes of explanation and not limitation, exemplary, or representative, embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

Figure 1B:
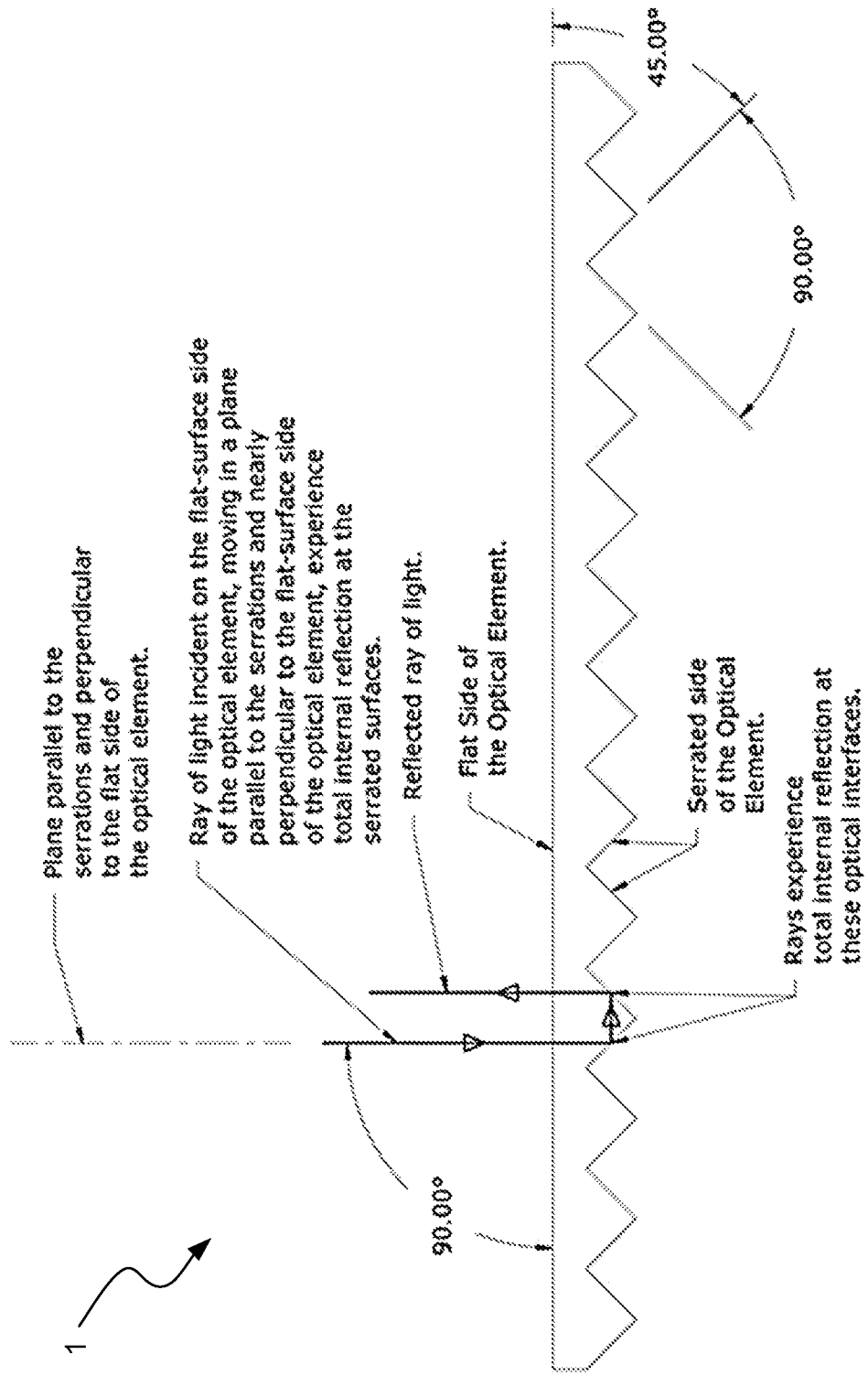
Figure 1C:
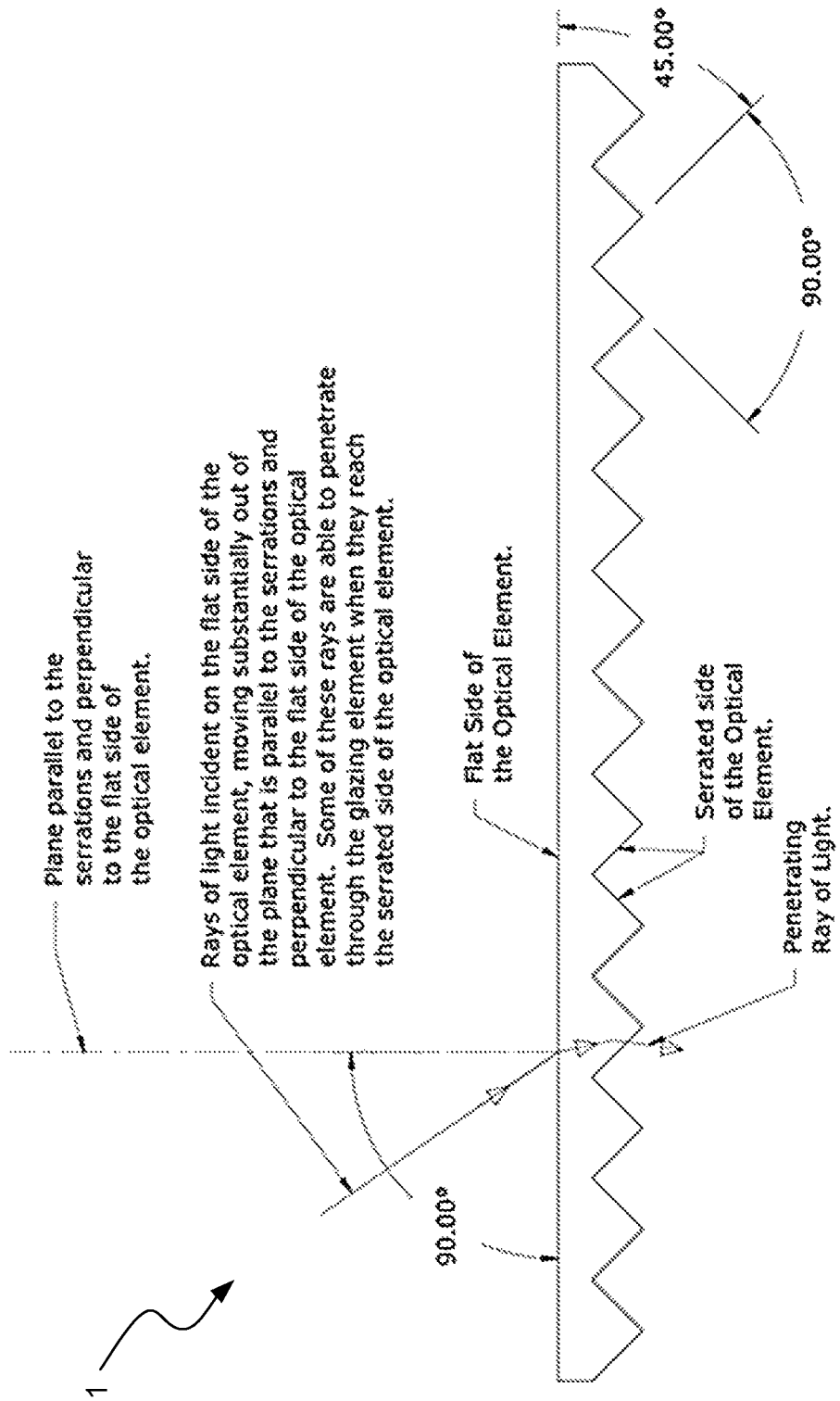

FIGS. 1A-1C are top cross-sectional views of an optical element 1 in accordance with a representative embodiment that can be incorporated into an aperture of a building envelope. The optical element 1 is optically transmissive to diffuse skylight and reflective to beam sunlight. The optical element 1 comprises an optically clear medium, such as plastic or glass, for example. In accordance with this embodiment, the optical element 1 has a generally flat surface on one side and a serrated surface on the opposite side, as depicted in FIG. 1A. The generally flat surface is on the side that faces away from the building such that exterior light is incident on the flat surface before it is incident on the serrated surface. The side having the serrations faces the interior of the building. In accordance with an embodiment, the serrations are linear, creating a uniform cross section along the length of the optical element 1. In an example, the serrated-surface planes are at an angle of approximately 450 to the plane of the flat surface on the opposite side of the glazing element. The inventive principles and concepts are not limited to this angle being approximately 45°. The angle typically ranges between about 30° and 60°. The serrations are symmetric in the embodiment shown in FIGS. 1A-1C, but they are not required to be symmetric.

FIG. 1B depicts the manner in which the serrations reflect beam sunlight. FIG. 1B shows the optical behavior for rays incident on the flat side of the optical element. The beam sunlight rays are incident in a plane perpendicular to the flat side of the optical element 1 and parallel to the length-wise direction of the serrations on the other side of the optical element 1. In this example in which the serrated-surface planes are at an angle of approximately 45° to the plane of the flat surface on the opposite side, the incident light on the serrated-surface planes is reflected by total internal reflection, as depicted in FIG. 1B. Therefore, substantially all of the beam sunlight is reflected and does not pass through the aperture in which the optical element 1 is incorporated or installed.

FIG. 1C depicts the manner in which the flat surface and the serrated surface pass diffuse skylight. The rays of diffuse skylight and not incident in a plane perpendicular to the flat side of the optical element and parallel to the serrations on the other side of the optical element. Therefore, these rays are not reflected by total internal reflection, but rather, they pass through the flat surface, are refracted to some extent and continue through the serrated surface, which again refracts the light to some extent. All, or substantially all of the diffuse skylight is transmitted through the optical element.

To be effective in reflecting beam sunlight away from the building, the optical element 1 should be rotated continuously or periodically, tracking the sun in such a manner that the beam sunlight is incident on the flat side of the optical element, and in a plane that is both substantially perpendicular to the flat side of the optical element 1 and substantially parallel to the direction of the serrations.

The optical element typically has one of two general configurations:
1. A series of optical slats with:
    the serrations running parallel to the long direction of the slat
    a mechanism being provided to rotate each slat about an axis parallel to the long direction of the slat.
2. A glazing element, that rotates in its plane about an axis perpendicular to its plane.

As a glazing element that is part of the overall aperture glazing assembly, the optical element can encapsulate a still layer of air (or other insulating gas, such as Argon), thereby enhancing the thermal integrity of the overall aperture glazing assembly. As a glazing element that is part of the overall aperture glazing assembly, the optical element can also provide additional surfaces for a low-E coating, which can help suppress thermal radiation transfer through the aperture glazing assembly.

Serrated optical elements have been used in:
Fresnel lenses in lighthouses and ships.
Light diffusing elements in fluorescent fixtures, in which capacity they mainly serve the purpose of transmitting light while obscuring, or blurring, the image of the fluorescent lamps and other parts of the fixture that might be regarded as unsightly.
Optical elements or systems intended to redirect light entering a building aperture. Such optical elements or systems did not track the sun movement.

Total internal reflection in optically dense material has been used in:
Binoculars, as a way of extending the light pathway, thereby facilitating higher magnification of the image of the object being observed.
Fiber optics, to contain light being transmitted from one location to another for purposes of data transmission.
The Prism Light Guide, invented by Lorne Whitehead (U.S. Pat. No. 4,260,220), to transmit light from one location to another for purposes of illuminating building interiors.
A Cyro glazing product, as a way of rejecting some portion of the beam sunlight incident on an aperture in a building. The Cyro product did not track the sun, which means that it only worked at limited angles of the beam sunlight.

What has not been proposed, and what is the subject of the present disclosure, are uses of optical elements or systems that track the sun to facilitate the use of total internal reflection to maximize the rejection of beam sunlight while still admitting substantial amounts of diffuse skylight and diffuse light reflected off of exterior surfaces, such as the ground.

Figure 2:
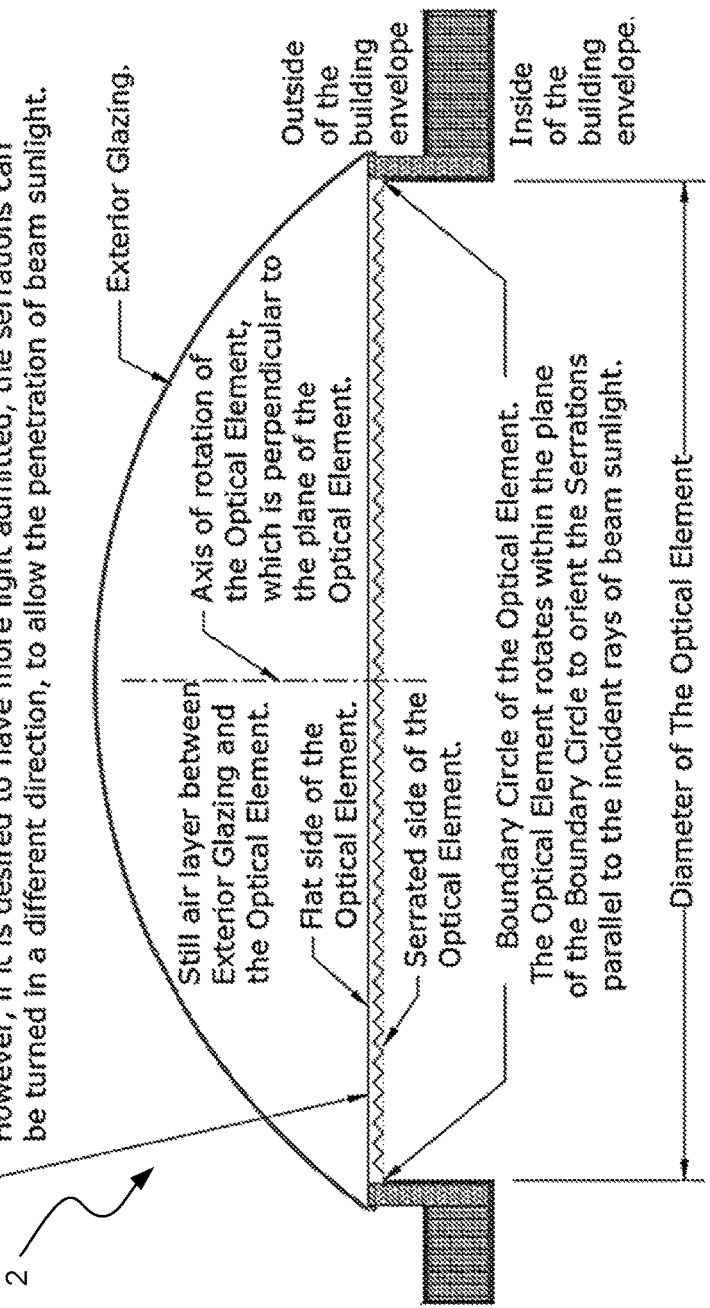
FIG. 2 is a top view of a circular optical element mounted in a circular aperture in accordance with another representative embodiment, with the optical element being rotated about a vertical axis of rotation at the center of the optical element to track the Sun.
Figure 3:
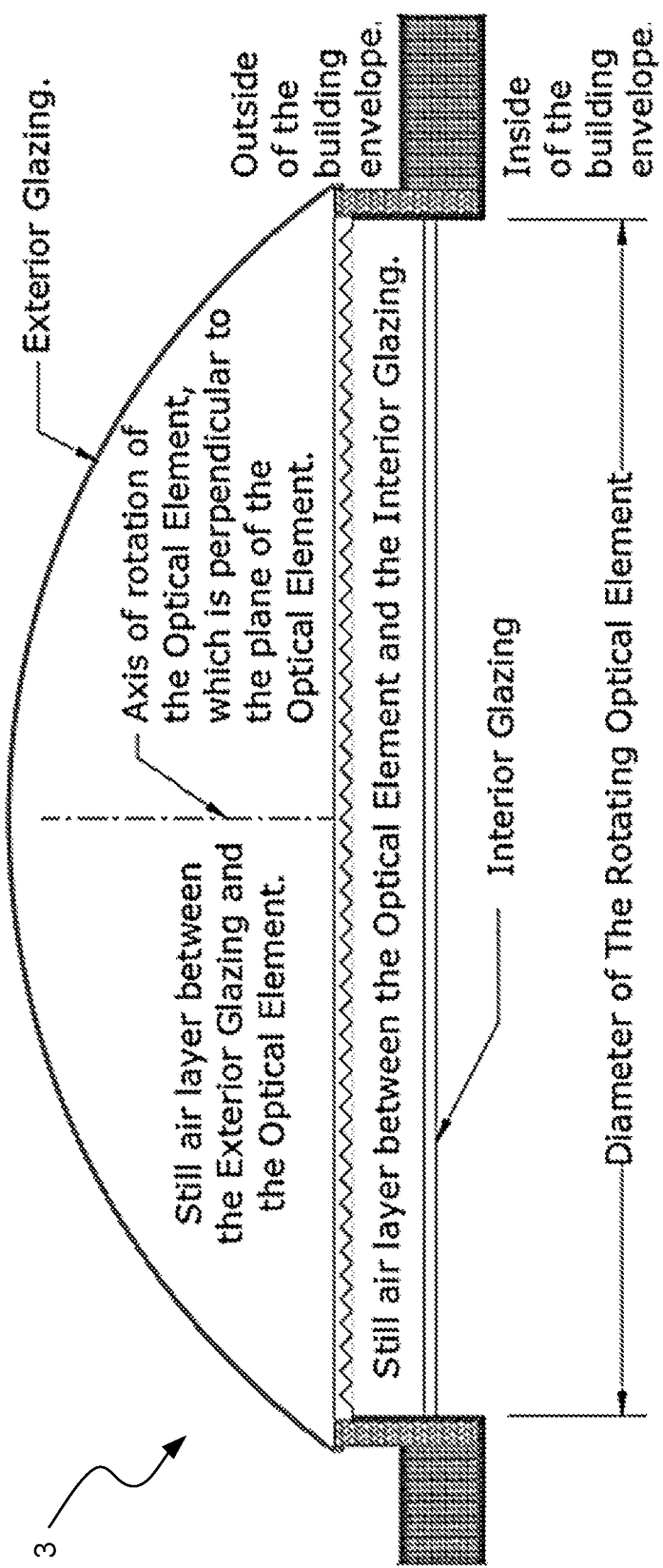
FIG. 3 is a top view of a circular optical element mounted in a circular aperture in accordance with another representative embodiment that is identical to the configuration shown in FIG. 2 except that the optical element shown in FIG. 3 has a region filled with still air in between the serrated surface and an interior glazing.
Figure 4:
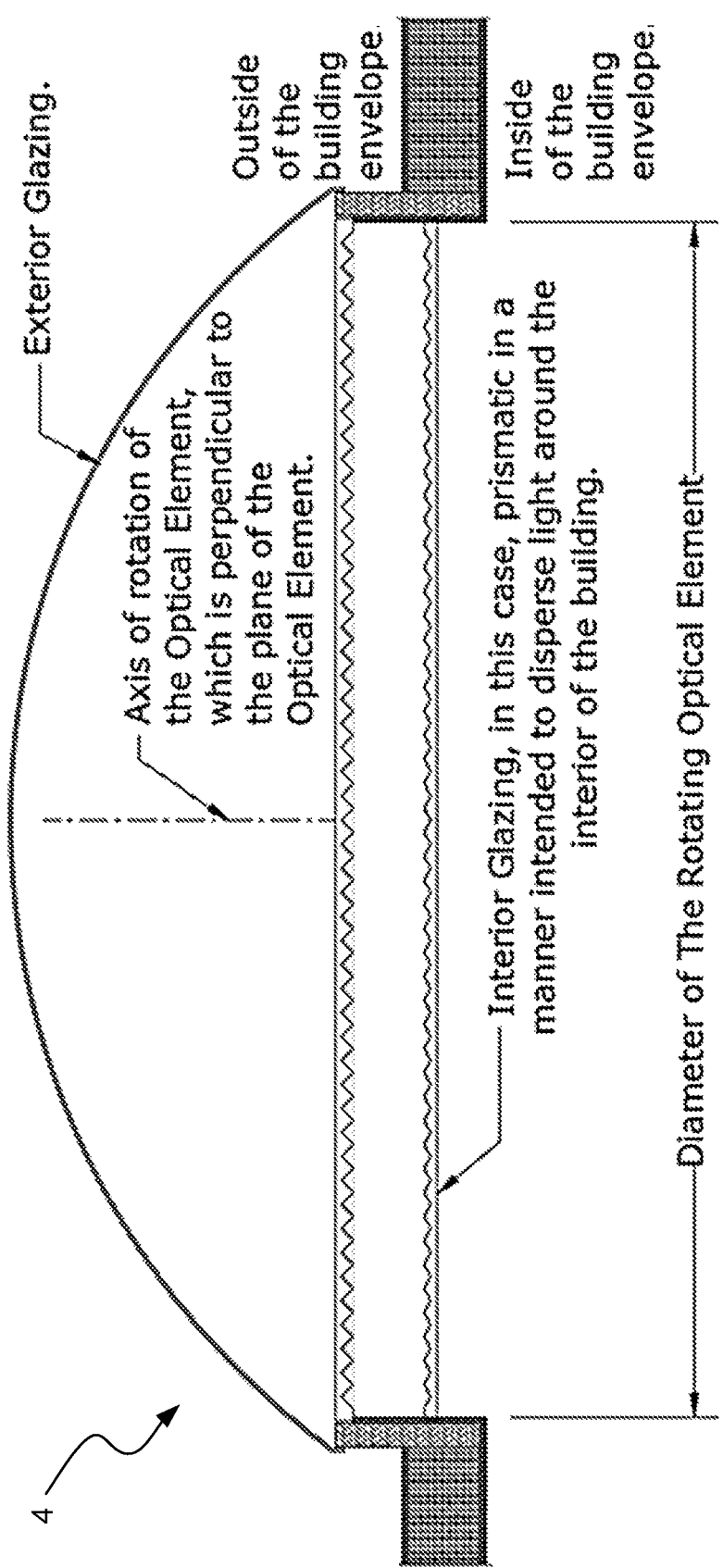
FIG. 4 is a top view of a circular optical element 4 mounted in a circular aperture in accordance with another representative embodiment that is identical to the configuration shown in FIG. 3 except that the interior glazing is prismatic or diffusive to disperse the diffuse skylight into the interior of the building.

FIG. 2 is a top view of a circular optical element 2 mounted in a circular aperture in accordance with another representative embodiment, with the optical element 2 being rotated about a vertical axis of rotation at the center of the optical element 2 to track the sun. FIG. 3 is a top view of a circular optical element 3 mounted in a circular aperture in accordance with another representative embodiment that is identical to the configuration shown in FIG. 2 except that the optical element shown in FIG. 3 has a region filled with still air in between the serrated surface and an interior glazing. FIG. 4 is a top view of a circular optical element 4 mounted in a circular aperture in accordance with another representative embodiment that is identical to the configuration shown in FIG. 3 except that the interior glazing is prismatic or diffusive to disperse the diffuse skylight into the interior of the building.

The optical elements 1-4 shown in FIGS. 1-4, respectively, having the serrated surfaces used in conjunction with a rotating mechanism within a building aperture, or associated with a building aperture, reflect away beam sunlight while admitting diffuse skylight and diffuse light reflected off terrain or other surfaces external to the building.

In accordance with the representative embodiment shown in FIGS. 1A-1C, the optical element 1 comprises a flat sheet having a flat surface on one side and a serrated surface on the opposite side. In accordance with the representative embodiment shown in FIGS. 2-4, the circular optical element 2-4 comprises a generally circular sheet having a flat surface on one side, a serrated surface on the opposite side, and an exterior glazing. The generally circular sheet rotates about an axis that is perpendicular to the sheet and located at the center of the optical element. The optical elements 3 and 4 further comprise interior glazing surfaces and can include other features, such as a pocket for still air in between the serrated surface and the interior glazing surface, and/or prismatic or diffusive elements formed on or in the interior glazing surface.

The circular optical elements 2-4 can be configured to fully protect the circular aperture against all incoming beam sunlight. Alternatively, the circular optical elements 2-4 can be configured to partially protect a non-circular aperture, with beam sunlight penetrating through the unprotected parts of the aperture lying outside the circular optical elements 2-4. The optical elements 1-4 can provide additional surfaces for a low-E coating, which can help suppress thermal radiation transfer through the aperture glazing assembly.

If desired, the optical elements 1-4 can be rotated in such a way so as to intentionally admit some amount of beam sunlight on occasion.

When properly sealed around the boundary of the building aperture, the optical element can work in conjunction with the exterior of the building. For example, weather-resisting glazing can be part of, or used in conjunction with, the optical element to encapsulate a still layer of air (or other insulating gas, such as Argon), as shown in FIGS. 3 and 4, thereby enhancing the thermal integrity of the overall aperture glazing assembly.

Figure 5:
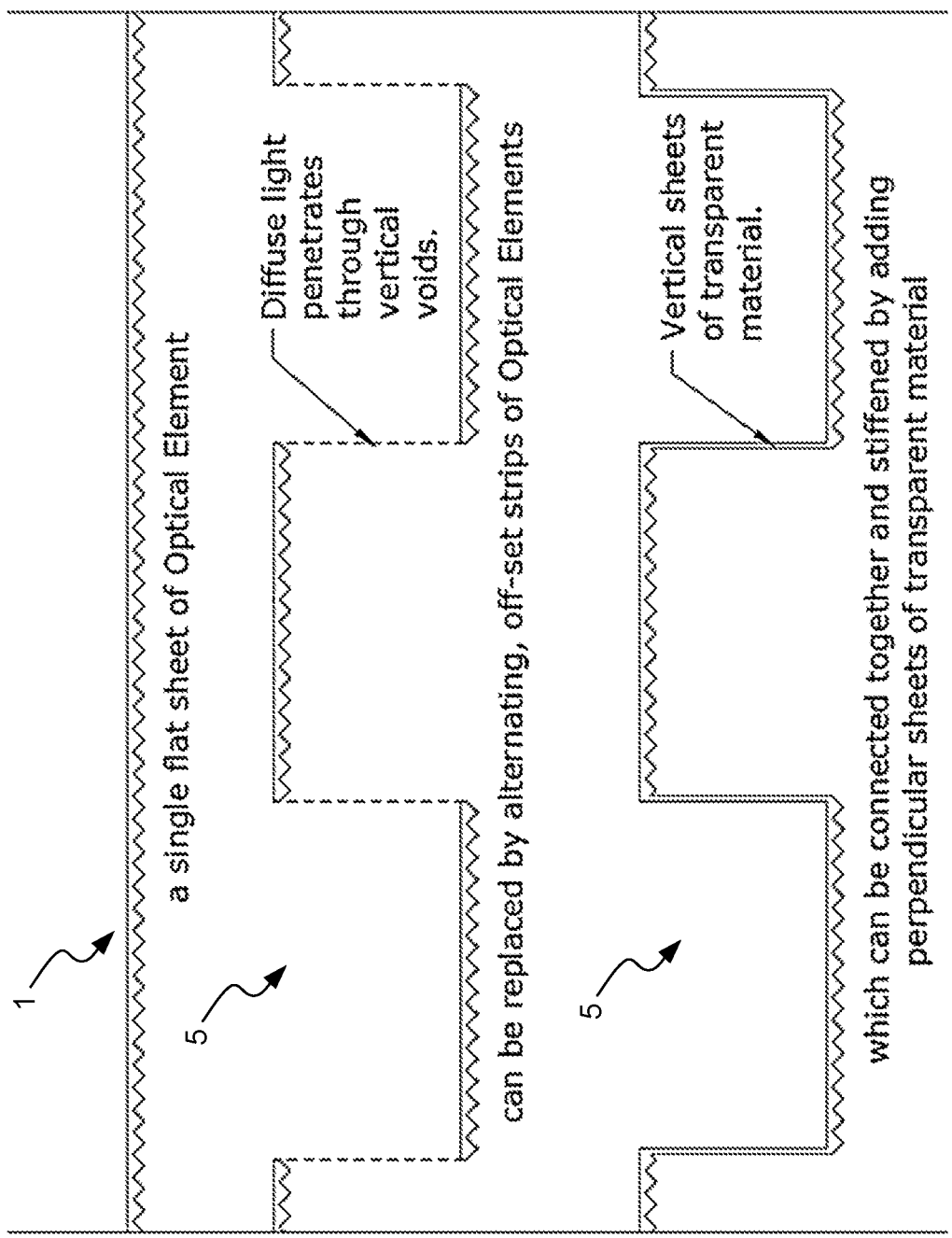
FIG. 5A shows the flat optical element shown in FIGS. 1A-1C.
FIGS. 5B and 5C show an alternative configuration for the optical element shown in FIGS. 1A-1C in accordance with an embodiment in which the optical element is split into alternating, offset strips to facilitate admitting more off-axis diffuse light and dispersing the light more uniformly around the building interior.

FIG. 5A shows the flat optical element 1 shown in FIGS. 1A-1C. FIGS. 5B and 5C show an alternative configuration for the optical element 1 in accordance with an embodiment in which the optical element 5 is split into alternating, offset strips to facilitate admitting more off-axis diffuse light and dispersing the light more uniformly around the building interior. As shown in FIGS. 5B and 5C, the optical element 5 includes vertical portions that are absent of the serrations and that are optically transmissive, whereas the other portions of the optical element include the serrated surfaces that act in the manner described above to reflect beam sunlight while passing on-axis diffuse skylight. The vertical voids all off-axis diffuse light to pass through the optical element 5 into the interior of the building.

Figure 6:
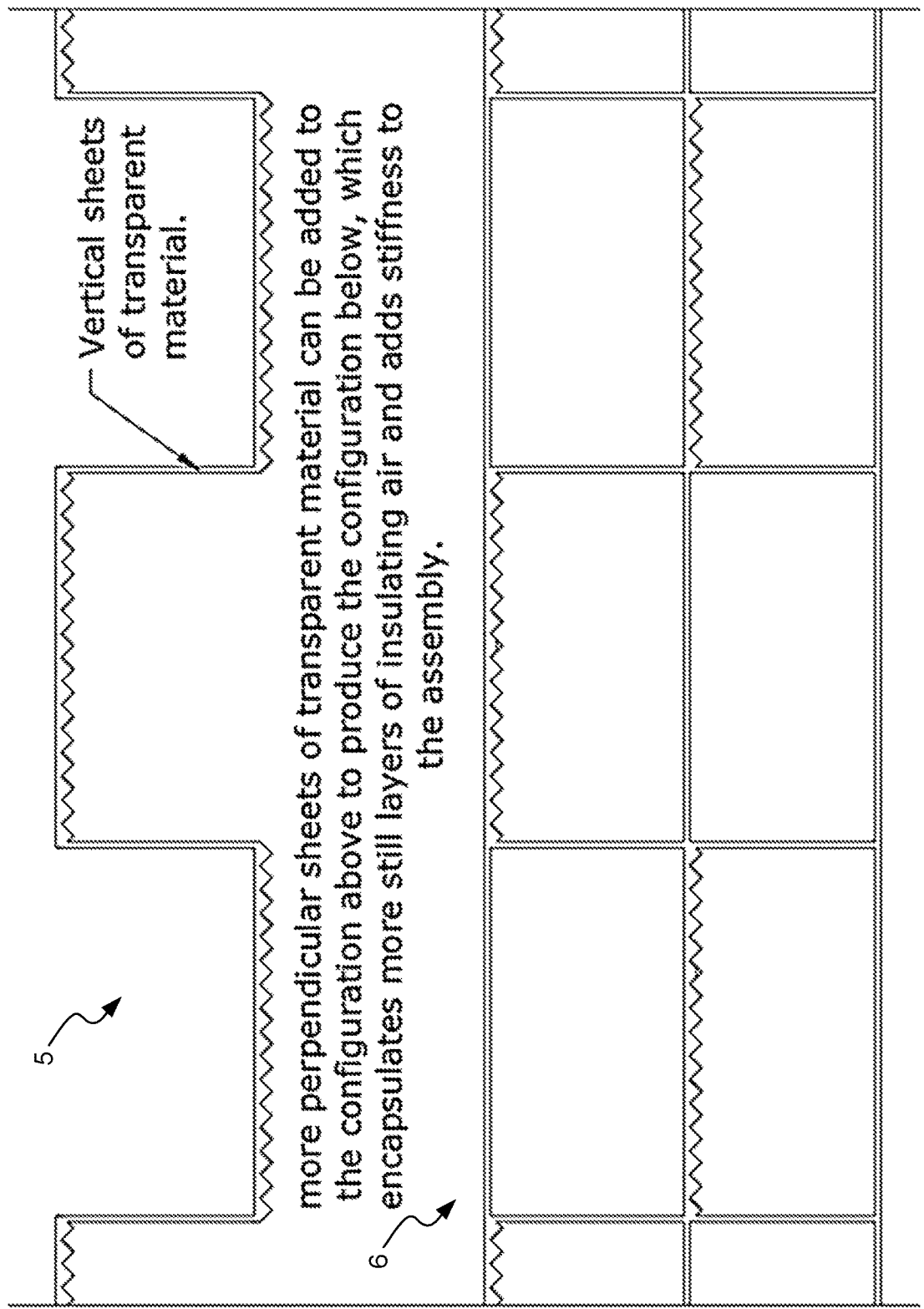
FIG. 6 shows a representative embodiment of the optical element that has a configuration that includes the offset strips shown in FIGS. 5B and 5C, but further comprises additional horizontal and vertical portions of optically transparent material that encapsulate more layers of still insulating air and provide additional stiffness for mechanical stability.

FIG. 6 shows a representative embodiment of the optical element 6 that has a configuration that includes the offset strips shown in FIGS. 5B and 5C, but further comprises additional horizontal and vertical portions of optically transparent material that encapsulate more layers of still insulating air and provide additional stiffness for mechanical stability.

Figure 7:
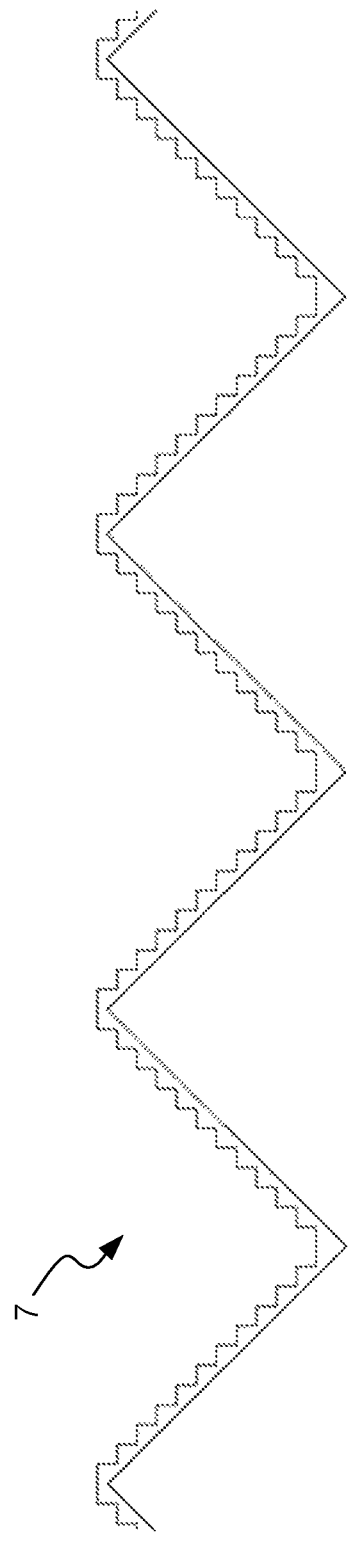
FIG. 7 shows an alternative configuration for the optical element in accordance with an embodiment in which the serrated surface of the optical element is corrugated to add stiffness.
Figure 8:
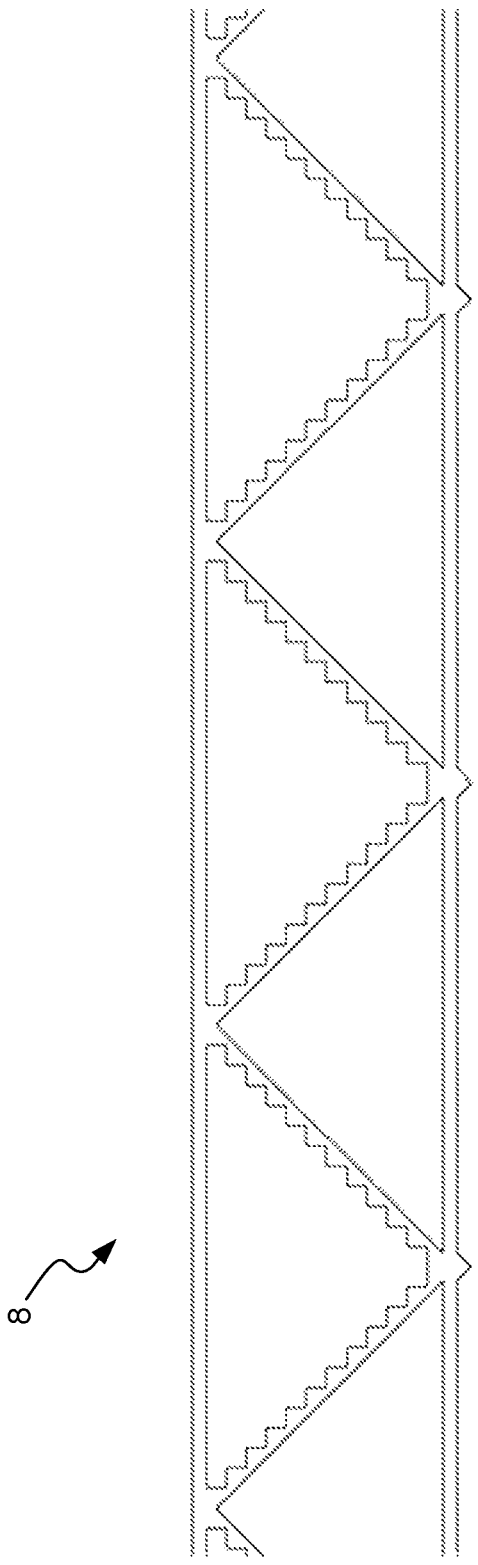
FIG. 8 shows an alternative configuration of the optical element shown in FIG. 7 in which sheets of material have been added on each side of the serrated surface to encapsulate a still air layer for thermal resistance and to add stiffness in both directions by creating a two-way stressed skin panel that is beam-like for spanning in one direction and truss-like for spanning in the other direction.

FIG. 7 shows an alternative configuration for the optical element 1 in accordance with an embodiment in which the serrated surface 7 of the optical element is corrugated to add stiffness. FIG. 8 shows an alternative configuration of the optical element shown in FIG. 7 in which sheets of material have been added on each side of the serrated surface 8 to encapsulate a still air layer for thermal resistance and to add stiffness in both directions by creating a two-way stressed skin panel that is beam-like for spanning in one direction and truss-like for spanning in the other direction.

Figure 9A:
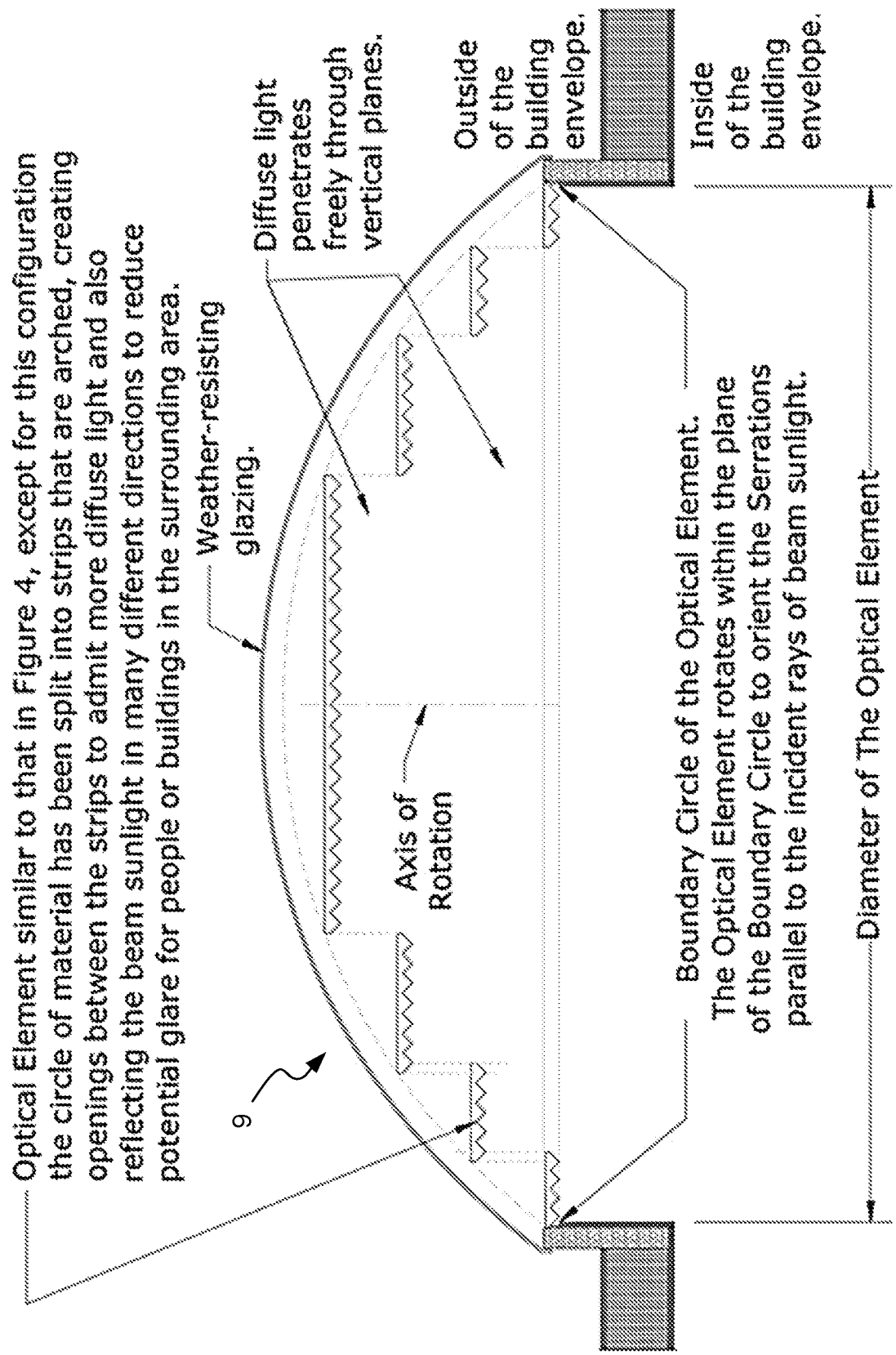
FIG. 9A shows a configuration of the optical element in accordance with a representative embodiment that is similar to the configuration of the optical element shown in FIG. 2, with the variation that the optical element is arched out of the plane of the originating circle.
Figure 9B:
FIG. 9B shows a three-dimensional (3-D) rendering of the optical element shown in FIG. 9A.
Figure 9C:
FIG. 9C shows a 3-D cross-sectional view of the optical element shown in FIG. 9B.

FIG. 9A shows a configuration of the optical element 9 in accordance with a representative embodiment that is similar to the configuration of the optical element 2 shown in FIG. 2, with the variation that the optical element 9 is arched out of the plane of the originating circle. FIG. 9B shows a three-dimensional (3-D) rendering of the optical element 9 shown in FIG. 9A and FIG. 9C shows a 3-D cross-sectional view of the optical element 9. Arching of the circular sheet having the serrated surface creates vertical voids similar to what was described above with reference to FIG. 5B that are absent of the serrations to allow diffuse light to pass through the vertical portions into the interior of the building.

Figure 10A:
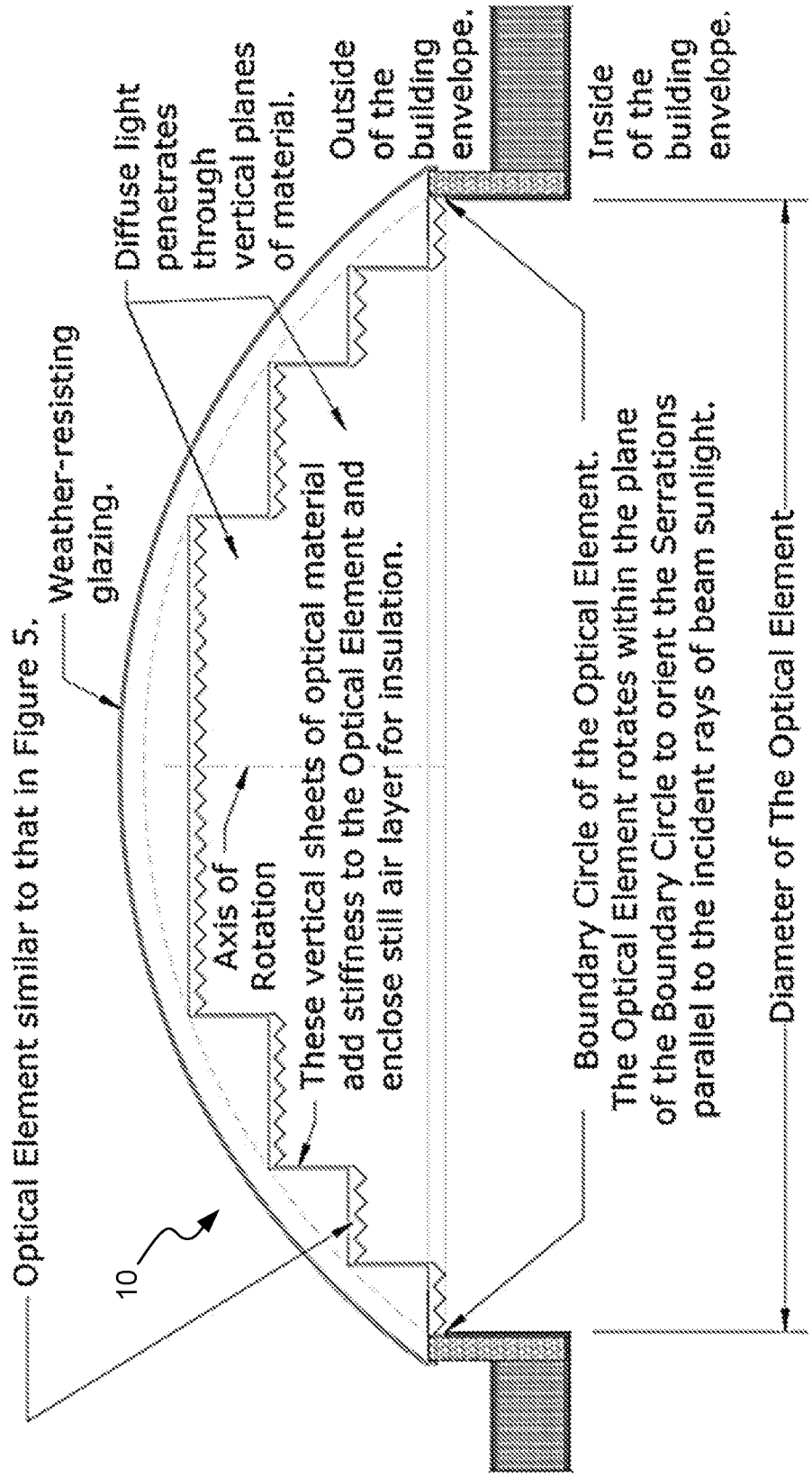
FIG. 10A shows a configuration of the optical element in accordance with a representative embodiment that is identical to the optical element shown in FIG. 9A, except the vertical voids shown in FIG. 9A are covered with optical transmissive vertical sheets, similar to the configuration of the optical element shown in FIG. 5C.
Figure 10B:
FIG. 10B shows a 3-D rendering of the optical element shown in FIG. 10A.
Figure 10C:
FIG. 10C shows a 3-D cross-sectional view of the optical element shown in FIG. 10B.

FIG. 10A shows a configuration of the optical element 10 in accordance with a representative embodiment that is identical to the optical element 9 shown in FIG. 9A, except the vertical voids shown in FIG. 9A are covered with optical transmissive vertical sheets, similar to the configuration of the optical element 5 shown in FIG. 5C. FIG. 10B shows a 3-D rendering of the optical element 10 shown in FIG. 10A and FIG. 10C shows a 3-D cross-sectional view of the optical element 10. As with the vertical voids shown in FIGS. 9A-9C, the optically-transparent vertical sheets allow diffuse light to pass into the interior of the building, but unlike the vertical voids, the vertical sheets encapsulate still air between the surfaces and the exterior glazing for insulation.

Figure 11:
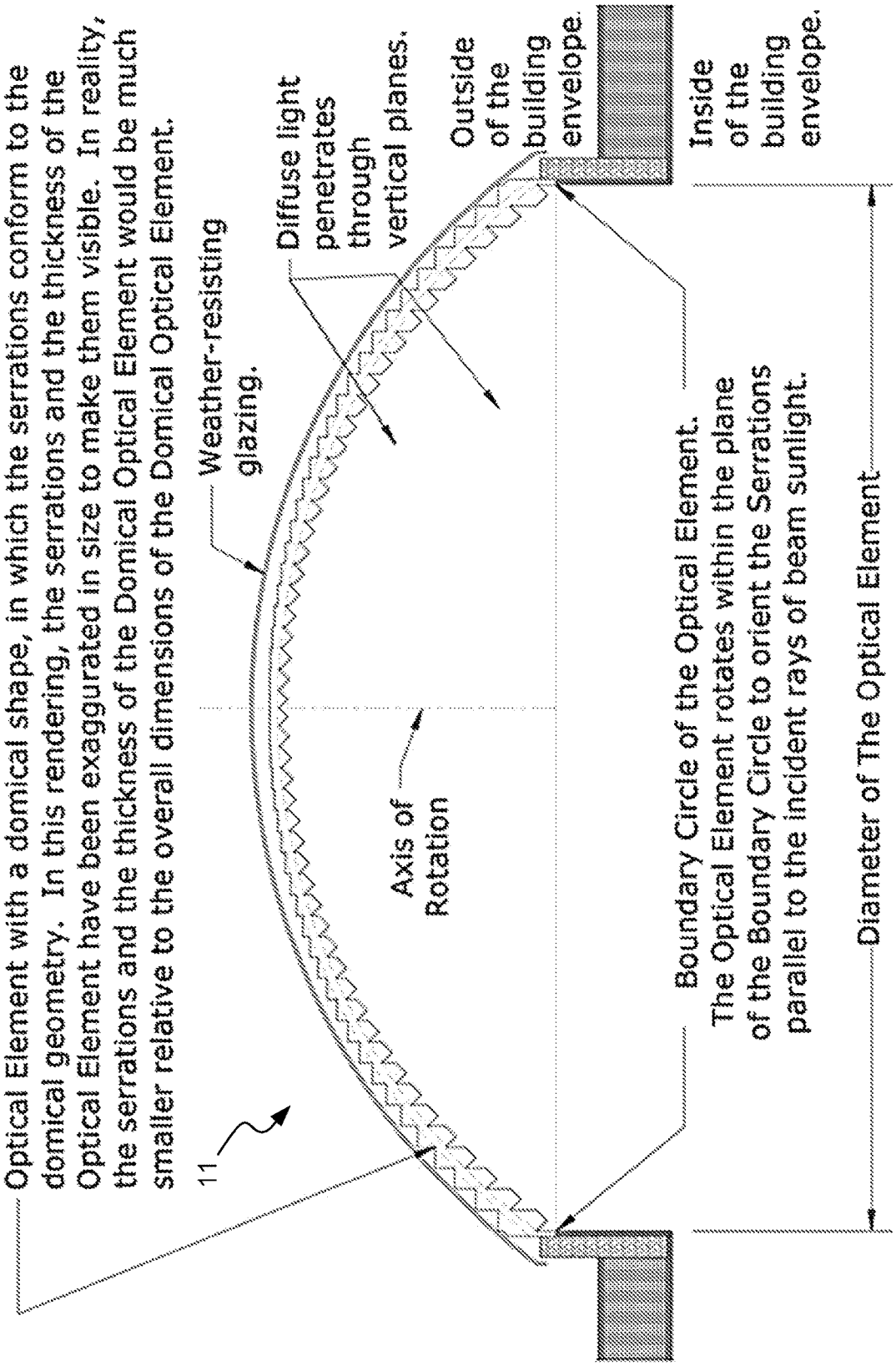
FIG. 11 shows a configuration of the optical element in accordance with a representative embodiment that is similar to the configuration shown in FIG. 10A in that the optical element is arched out of the plane of the originating circle in a gradual, step-wise manner, producing a generally domical shape.

FIG. 11 shows a configuration of the optical element 11 in accordance with a representative embodiment that is similar to the configuration shown in FIG. 10A in that the optical element is arched out of the plane of the originating circle in a gradual, step-wise manner, producing a generally domical shape. In FIG. 11, the serrations and the thickness of the optical element 11 have been exaggerated in size to make them more visible. In reality, the serrations and the thickness of the domical optical element 11 would be much smaller relative to the overall dimensions of the domical optical element 11. In this embodiment, the serrations conform to the domical shape. Diffuse light penetrates through vertical panes of the serrations while the beam sunlight is reflected by the angled faces of the serrations. Conforming the serrations to the domical configuration does not change the optical behavior of the optical system, but improves structural integrity at the cost of increased manufacturing complexity.

Figure 12:
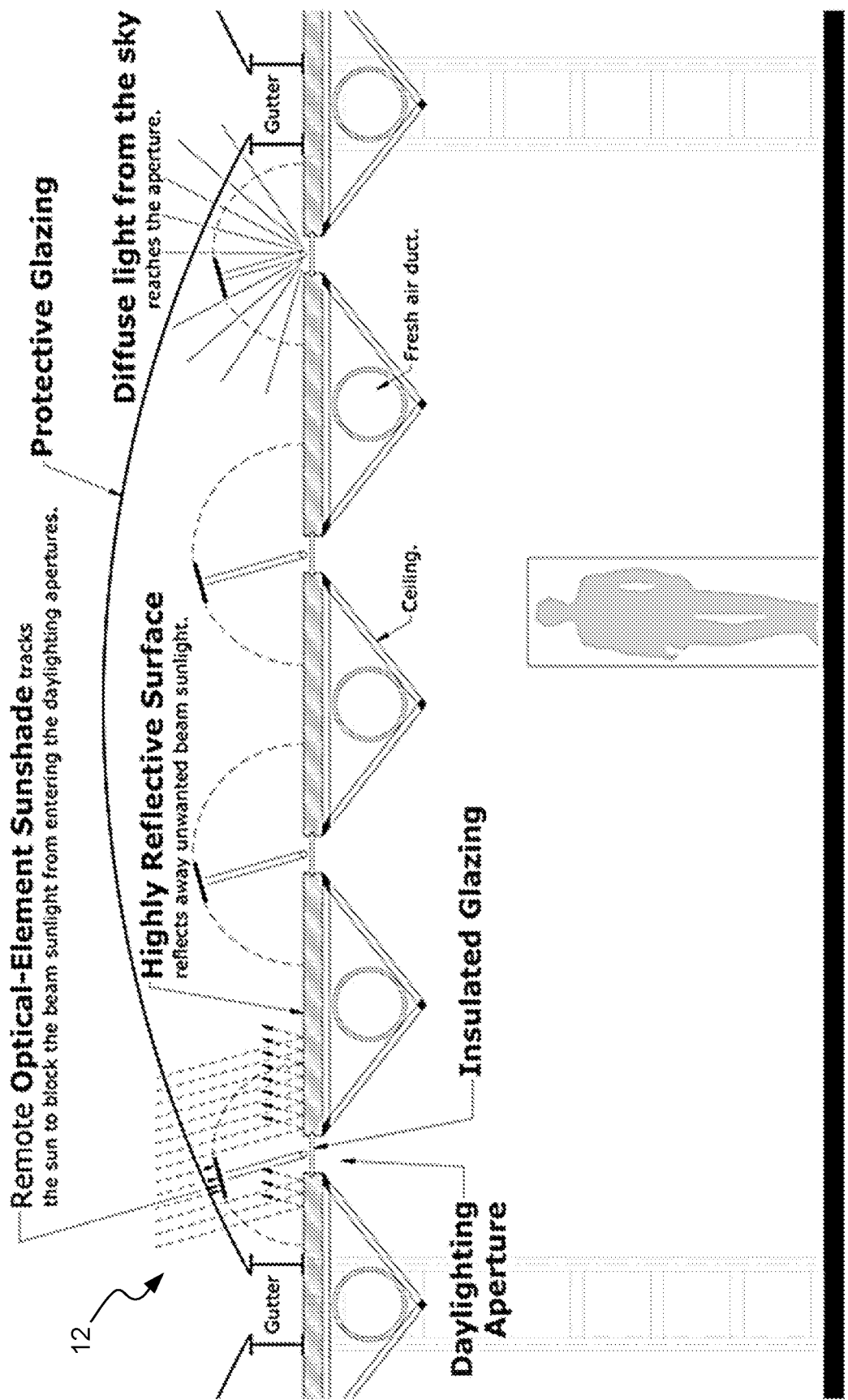
FIG. 12 shows an optical-element sunshade system in accordance with a representative embodiment that is suitable for linear apertures and that uses single-axis tracking on a rotating mechanism.

FIG. 12 shows an optical-element sunshade system 12 in accordance with a representative embodiment that is suitable for linear apertures and that uses single-axis tracking on a rotating mechanism. The system 12 comprises a plurality of optical elements coupled to separate mounts that are rotated by the rotating mechanism to track the sun. The optical elements can have any of the configurations described above, for example. The optical-element sunshade system 12 comprises a plurality of highly reflective surfaces, where adjacent highly reflective surfaces are separated from one another by daylight apertures that are covered with insulated glazing surfaces. Diffuse skylight that is not incident on the optical elements that track the sun passes through the insulated glazing and the daylight apertures into the interior of the building. Beam sunlight that that is not incident on the optical elements is incident on the highly reflective surfaces and is reflected by the highly reflective surfaces. The optical system 12 includes a protective upper glazing surface. The entire optical system 12 operates as an optical element sunshade that is installed on the top surface of the building.

Figure 13:
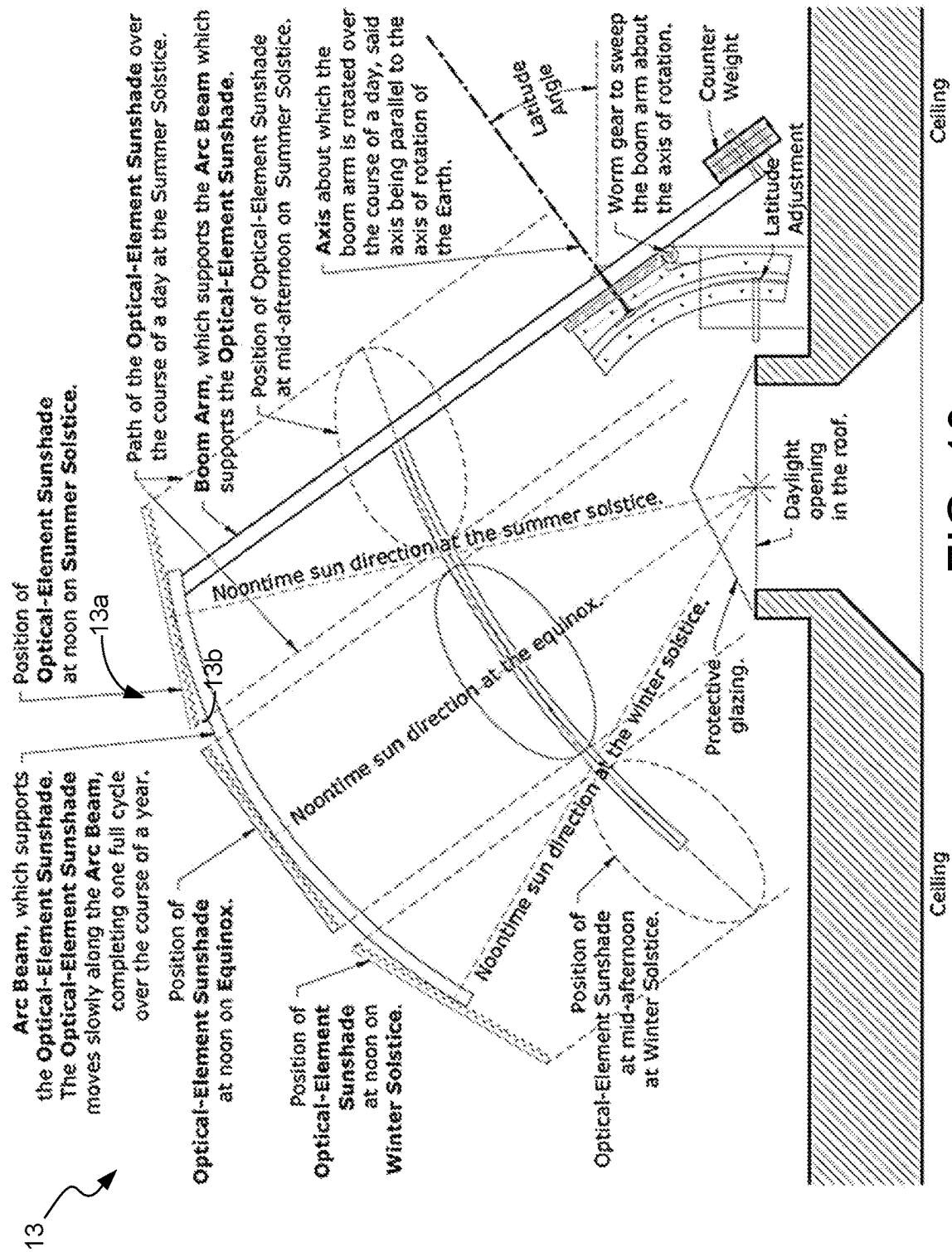
FIG. 13 shows a remote optical sunshade system designed for a circular aperture that uses an Equatorial Mount to adjust the location of the sunshade system in space in such a manner as to shade the aperture and to adjust the orientation of the sunshade system based on the time of the year so that the normal to the plane of the sunshade system is always pointing toward the Sun.

Localized apertures, such as, for example, circular openings in the roof, can be shaded by circular or elliptical optical sunshade systems that follow the sun using a double-axis, tracking mechanism. FIG. 13 shows a remote optical sunshade system 13 designed for a circular aperture. The system 13 uses an Equatorial Mount to adjust the location of the sunshade system 13 in space in such a manner as to shade the aperture and to adjust the orientation of the sunshade system 13 based on the time of the year so that the normal to the plane of the sunshade system 13 is always pointing toward the Sun. In the mount shown in FIG. 13, the optical-element sunshade 13a slides along the Arc Beam 13b to account for seasonal changes in sun position and rotates about an axis parallel to the earth's rotational axis to account for diurnal changes in sun position. This mounting system is similar to an Equatorial Mount for Celestial Telescopes.

As an alternative to the Equatorial Mount shown in FIG. 13, the remote optical-element sunshade 13 for the circular roof aperture can also be positioned in space and oriented toward the sun using an Altitude-Azimuth mount.

In situations where electricity generation is desired, the optical element(s) in the sunshade 12 or 13 can be replaced by concentrating Photo-Voltaic Cells, which can be highly concentrating, since the device is always pointed into the Sun. The heat generated by the Photo-Voltaic Cells does not significantly impact the building thermal loads, since the Cells are thermally detached from the building and remote from the building envelope. In addition, because the optical elements of all of the embodiments described above track the Sun, they can be configured with solar cells to harvest the energy of the Sun such that the optical elements do not increase the electrical load of the building or facility, or at least to offset the additional electrical load on the building or facility. In addition, the electrical energy generated by the Photo-Voltaic Cells can be used for any purpose, including, but not limited to, driving the tracking mechanism.

It should be noted that all variations of the optical element and optical systems described above can be utilized in all apertures in all parts of the building envelope, including all slopes, from horizontal to vertical, and all azimuthal orientations, with the caveat that the rotational algorithm will vary with the tilt and orientation of the aperture and the latitude of the building location.

Figure 14A:
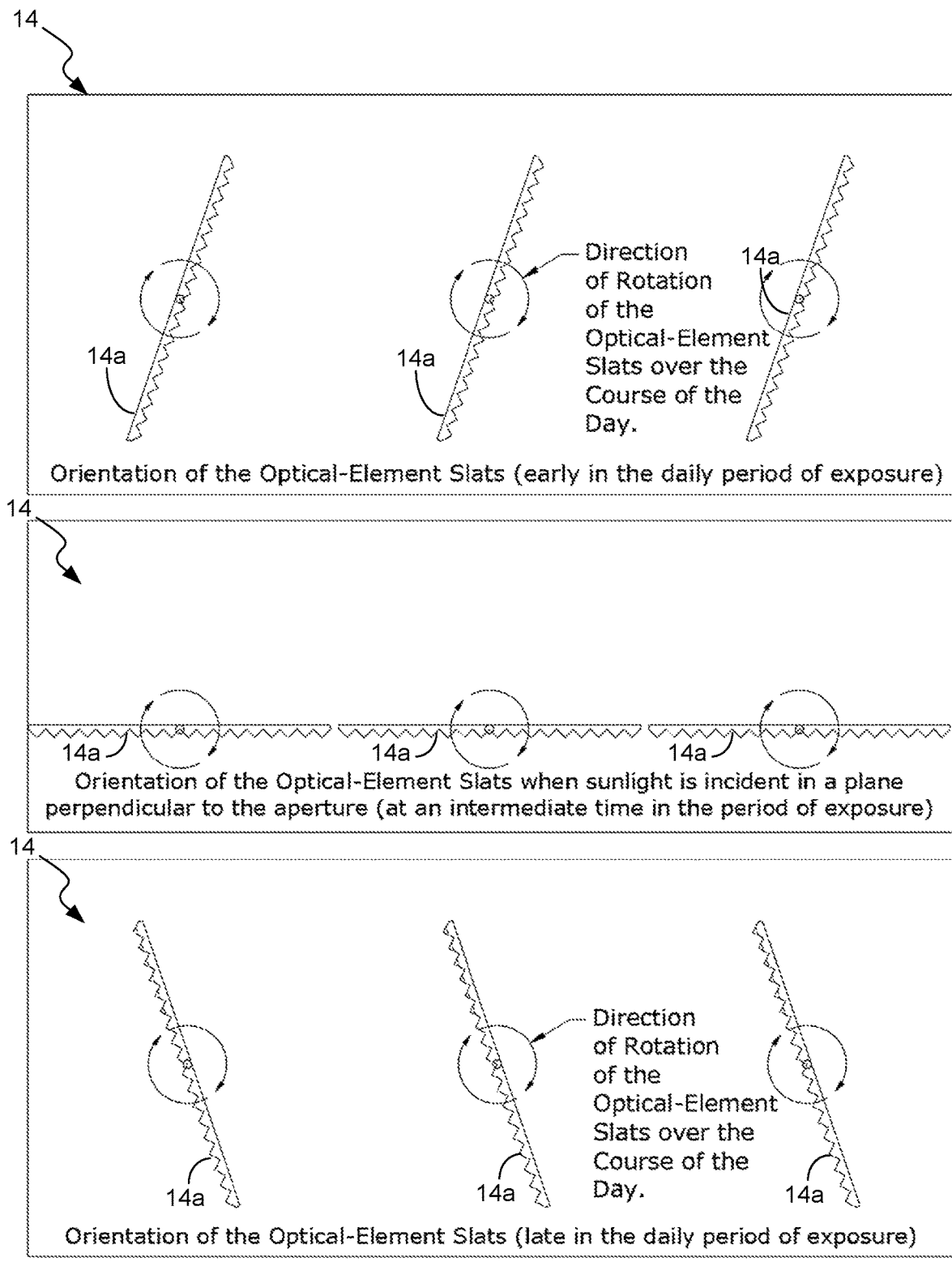
FIG. 14A shows the optical system in accordance with another representative embodiment comprising an array of parallel optical-element slats, each of which can comprise the optical elements having serrations on one side similar to the serrations shown in FIGS. 1A-1C.
Figure 14B:
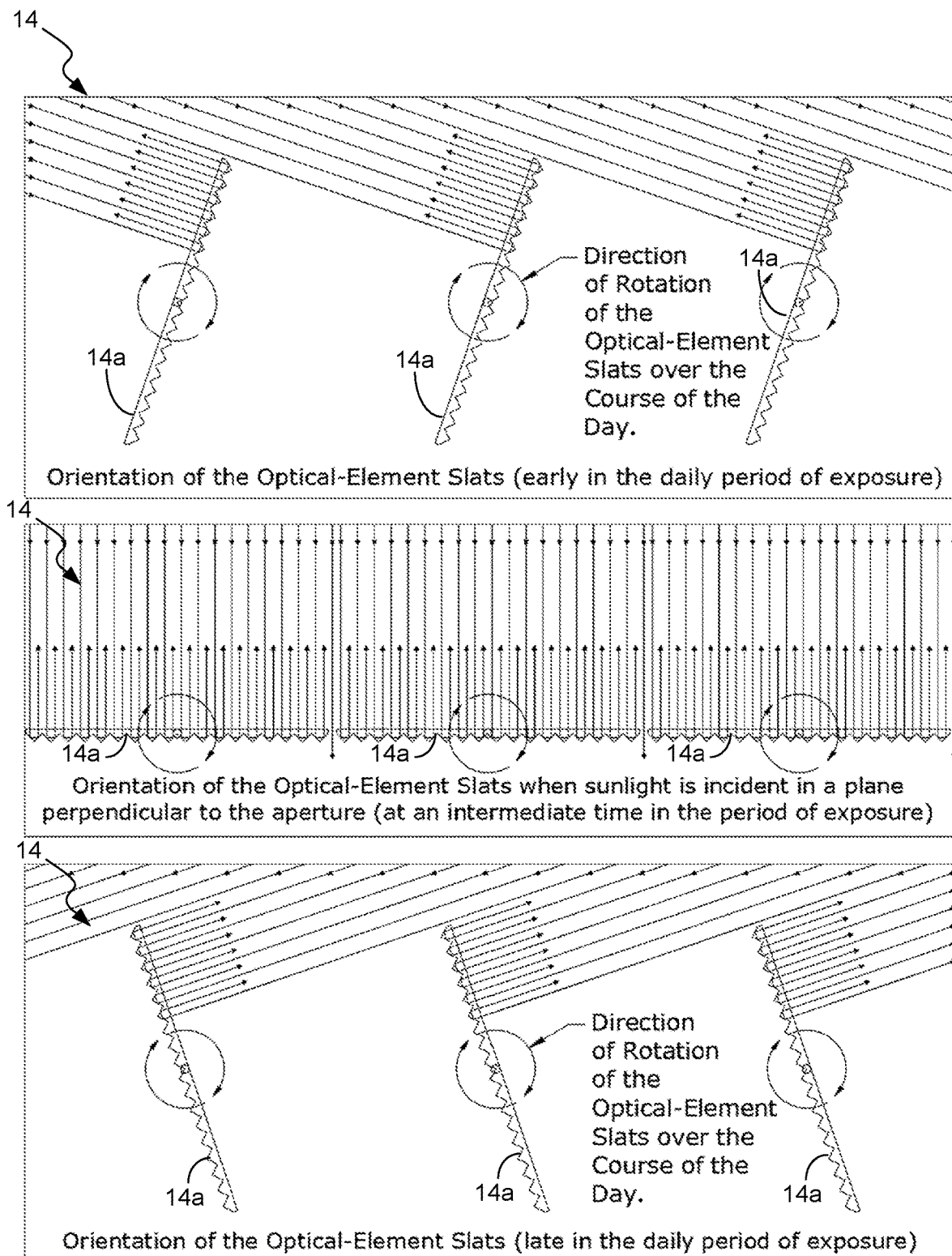
FIG. 14B shows the optical behavior of the optical system shown in FIG. 14A.

FIG. 14A shows the optical system 14 in accordance with another representative embodiment comprising an array of parallel optical-element slats 14a, each of which can comprise the optical elements having serrations on one side similar to the serrations shown in FIGS. 1A-1C. In accordance with this embodiment, the long dimension of the optical-element slats 14a is parallel to the serrations, and each slat 14a is able to rotate about an axis parallel to the serrations, as shown in FIG. 14A. The slats 14a are rotated to track the Sun so that the serrations reflect the beam sunlight by total internal reflection while passing the diffuse light, as described above with reference to FIGS. 1A-1C. FIG. 14B shows the optical behavior of the optical system shown in FIG. 14A.

Figure 15A:
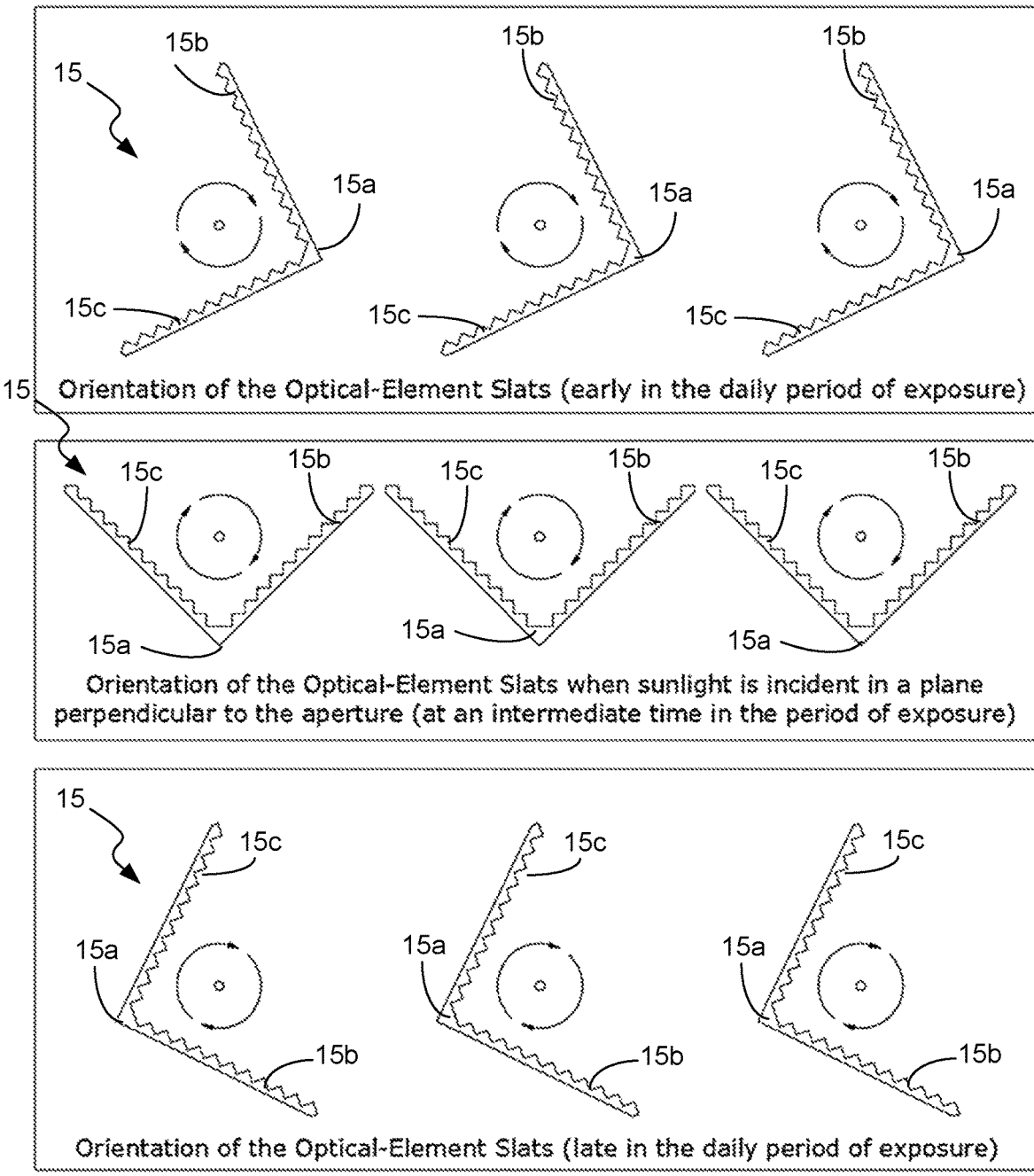
FIG. 15A shows the optical system in accordance with another representative embodiment that is a variation of the embodiment shown in FIG. 14A.

FIG. 15A shows the optical system 15 in accordance with another representative embodiment that is a variation of the embodiment shown in FIG. 14A. FIG. 15B shows the optical behavior of the optical system shown in FIG. 15A. The system 15 comprises optical-element slats 15a that have been stiffened by giving them an angular cross-sectional shape. In accordance with this representative embodiment, each slat 15a has first and second slat portions 15b and 15c that are coupled to one another at a 90° angle. The slats 15a are rotated as shown to track the sun so that the beam sunlight rays are always incident perpendicular to left side of the serrations of the slat portions 15b and to the right side of the serrations of slat portions 15c at a given time of the day, resulting in total internal reflection of the beam sunlight.

Figure 16A:
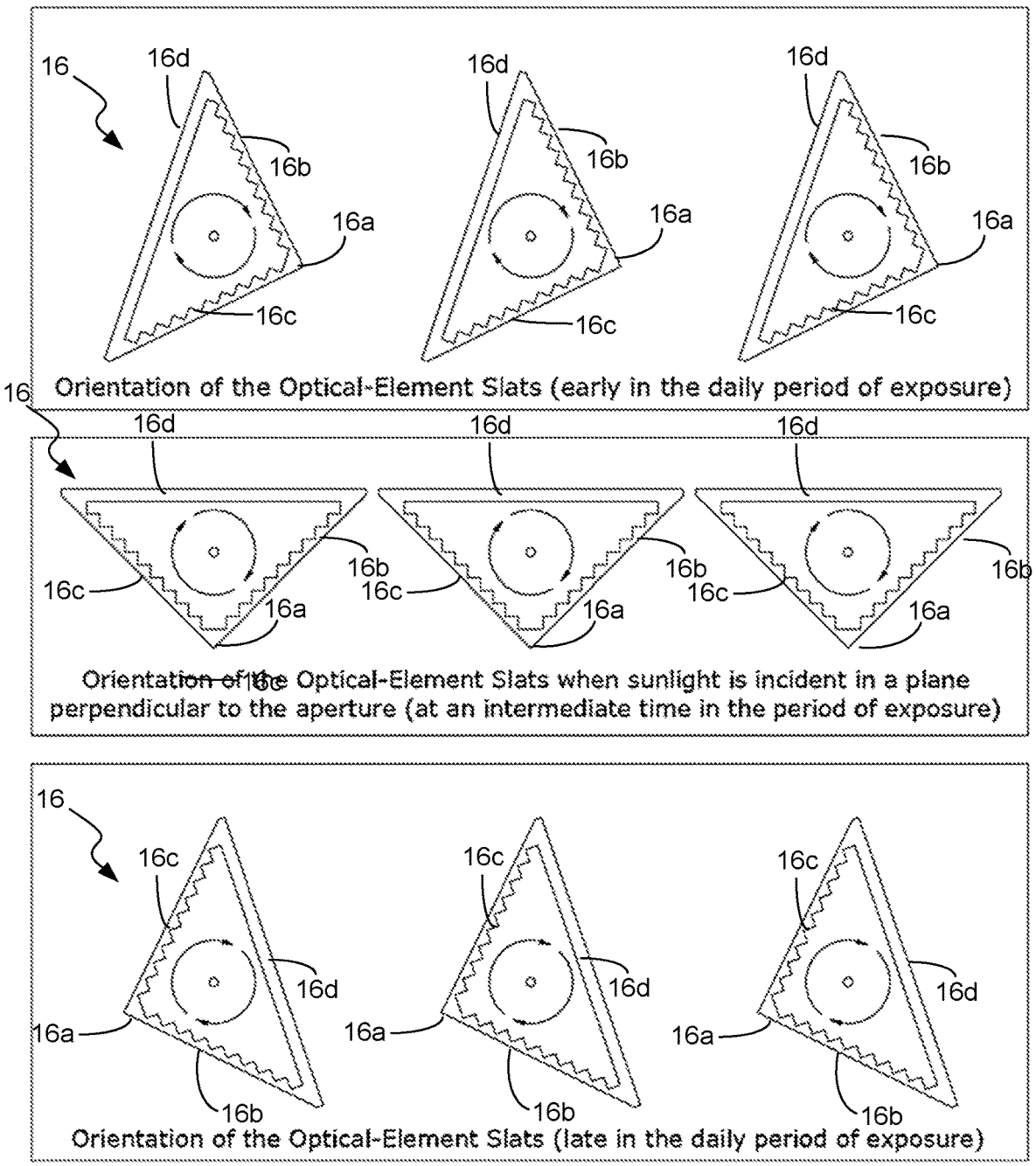
FIG. 16A shows the optical system in accordance with another representative embodiment that is a variation of the embodiment shown in FIG. 15.
Figure 16B:
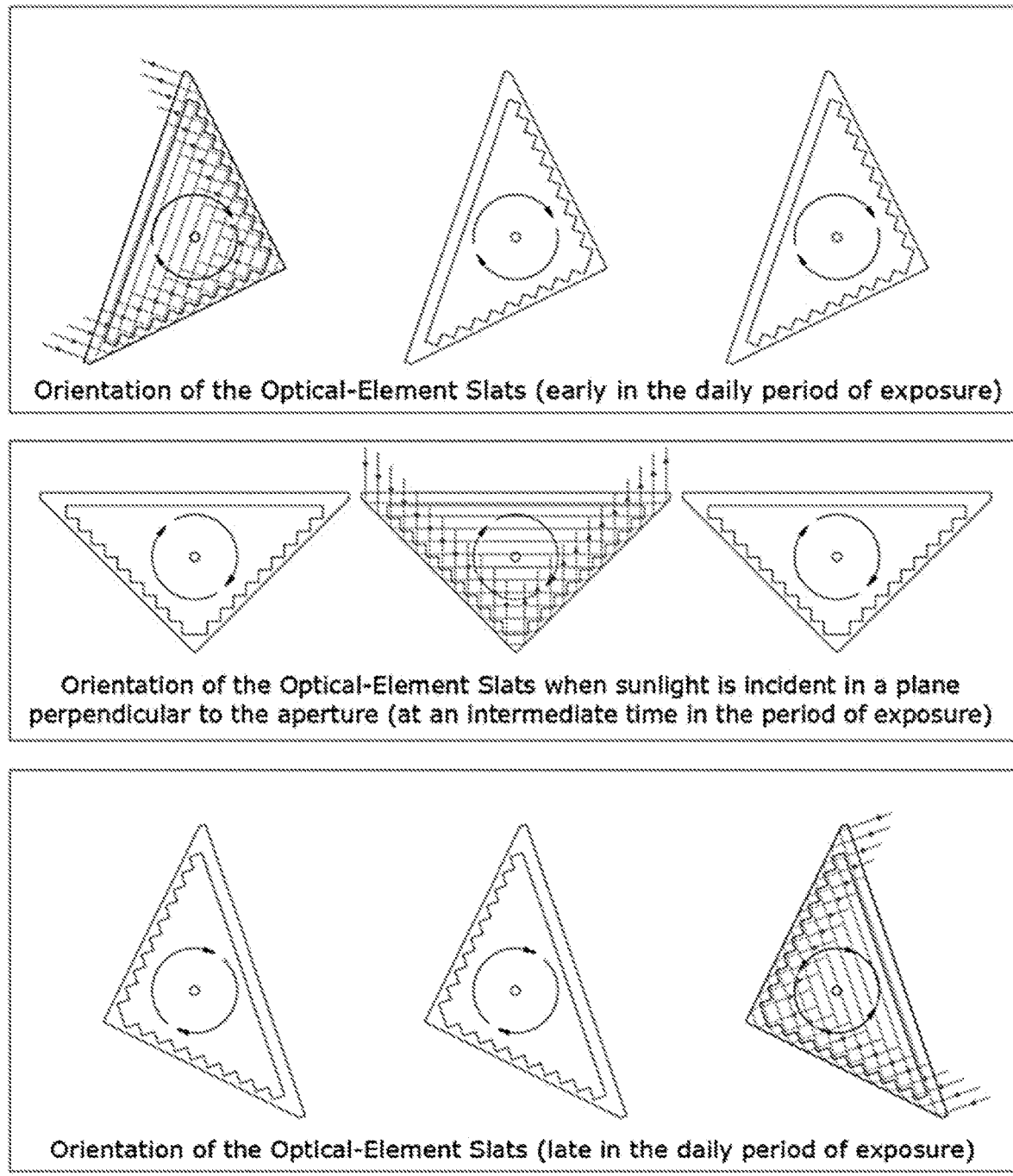
FIG. 16B shows the optical behavior of the optical system shown in FIG. 16A.

FIG. 16A shows the optical system 16 in accordance with another representative embodiment that is a variation of the embodiment shown in FIG. 15A. FIG. 16B shows the optical behavior of the optical system shown in FIG. 16A. The system 16 comprises optical-element slats 16a that have been stiffened by giving them a cross-sectional shape of an angular tube. In accordance with this representative embodiment, each slat 16a has first and second slat portions 16b and 16c and a stiffening portion 16d, all coupled together to form the cross-section of a triangular tube. The slats 16a are rotated as shown to track the sun so that the beam sunlight rays are always incident perpendicular to left side of the serrations of the slat portions 16b and to the right side of the serrations of slat portions 16c at a given time of the day, resulting in total internal reflection of the beam sunlight.

The optical-element slats shown in FIGS. 14A-16B can be arrayed in a plane parallel to the plane of the aperture. For example, for a vertical aperture, the optical-element slats can be suspended vertically, similarly to vertical blinds commonly manufactured for windows in buildings. In this configuration, the slats can either hang freely under gravity (as is common for vertical blinds) or be aligned more forcefully with constraints at the bottom of each of the slats.

With proper support, the array of optical-element slats can be sloped at any angle to make the plane of the array parallel to the plane of the aperture, regardless of the slope of the aperture. For example, the optical elements can be arrayed in a horizontal plane for a horizontal roof aperture or in a sloped plane for a sloped roof aperture.

The array of optical-element slats can be mounted in any of the following locations: external to the outermost layer of glazing in the aperture; internal to the innermost layer of glazing in the aperture; and between layers of glazing, where it is protected against wind, snow, ice, rain, and dirt (for example, in the interstitial volume in a double-envelope façade).

The axes of rotation of the optical-element slats can be arrayed in a plane NOT parallel to the plane of the aperture. For example, for a vertical aperture, the array of optical-element slats can be mounted above the aperture, projecting out from the façade of the building, in an Awning Configuration, which serves to shade the glazing below while still affording a view through the glazing that is not obscured by the optical distortion of the Optical-Element Slats.

The array of optical-element slats can be sloped at an angle to strike a balance between protecting the glazing below the array from excess sunlight while still allowing some view through that glazing that is not obscured by the optical distortion of the optical-element slats.

The array of optical-element slats can be sloped at any angle to reflect sunlight back toward the Sun, to avoid having the reflected sunlight cause thermal overload or glare for adjacent buildings.

Versions of the optical elements can be configured to send beam sunlight back toward the Sun, thereby eliminating all negative impacts of adjacent buildings. As an example, see FIG. 13, in which the normal to the optical-element sunshades are always facing directly toward the Sun, resulting in the incident sunlight being reflected directly back toward the sun.

The flat circular optical elements shown in FIGS. 2 and 3 can be mounted in various locations, including, for example: external to the outermost layer of glazing in the aperture; between layers of glazing in a double-envelope building, where the optical element and its support mechanism are protected against wind, snow, ice, rain, and dirt; and in the aperture in the building envelope, with hemispherical glazing outside to protect it against wind, snow, ice, rain, dirt from above and hemispherical glazing inside it to protect it from dirt from below; internal to the innermost layer of glazing. In this mode, a mechanism can be incorporated to cause the optical element to deviate from a plane, so that the sunlight can be spread over the ceiling to brighten and warm the space during the colder months of the year.

As previously noted, beam sunlight reflected back toward the Sun will not negatively impact any adjacent buildings. The only humans who could be negatively impacted are airplane pilots. At typical jet speeds, the transit time for a jet plane over a 10 ft diameter roof aperture will be on the order of a 1 hundredth of a second. Furthermore, at the scale of heights at which jet planes normally fly, a 10-ft-diameter reflector will act optically like a pin-hole in a pin-hole camera, meaning that the effective luminosity of the 10-ft-diameter reflector will be negligible. In other words, the reflective optical elements represent a negligible effect on pilots. A large lake will have a much greater impact on the pilot's vision. As an additional benefit to this system, the heat content of the solar radiation reflected back toward the sun will be lost from the earth's ecosphere, which means that it does not contribute to global warming.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. An optical system for reflecting direct beam sunlight while admitting diffuse skylight through building apertures, the optical system being configured to be secured to a building aperture of a building, the optical system comprising:
    at least a first optical element comprising at least a first sheet of optically transmissive material, said at least a first sheet having at least a first side and a second side, the first side facing away from the building, the second side facing an interior of the building, the second side having at least a first set of optical features formed therein that are designed to reflect beam sunlight away from the second side while passing diffusive light through the second side when the first optical element is in a first orientation relative to a Sun; and
    a rotation-imparting mechanism mechanically coupled to said at least a first optical element, the rotation-imparting mechanism imparting rotational motion to said at least a first optical element to cause said at least a first optical element to track the Sun and remain in the first orientation relative to the Sun such that rays of beam sunlight are incident on optical features of the first set of optical features at a preselected angle of incidence that results in the optical features reflecting the rays of beam sunlight away from the second side while passing the diffuse light through the second side.

2. The optical system of claim 1, wherein the optical features comprise an array of serrations formed in the second side and extending in a lengthwise direction that is substantially parallel to a plane in which the rays of beam sunlight propagate.

3. The optical system of claim 2, wherein each serration has first and second inner sides that are at a preselected angle to one another.

4. The optical system of claim 3, wherein the first sheet is divided into alternating offset strips of optical elements, wherein adjacent strips have vertical voids that are absent of the optical features such that diffuse light passes through the vertical voids.

5. The optical system of claim 4, wherein the vertical voids are covered with vertical sheets of optically transmissive material, and wherein diffuse light passes through the vertical sheets.

6. The optical system of claim 5, further comprising an internal glazing surface that is coupled to the vertical sheets such that still air is encapsulated in between the internal glazing surface, the vertical sheets and at least one of the first and second sides of the first sheet.

7. The optical system of claim 2, wherein the optical system comprises an array of parallel optical-element slats, each optical-element slat comprising a plurality of the optical elements having serrations on one side, a long dimension of the optical-element slats being parallel to the serrations, and each optical-element slat being able to rotate about an axis parallel to the serrations.

8. The optical system of claim 1, further comprising an external glazing surface, wherein said at least a first optical element works in conjunction with the external glazing surface to seal the building aperture and to encapsulate a still layer of air or other insulating gas to enhance a thermal integrity of the building aperture.

9. The optical system of claim 1, further comprising an interior glazing surface, wherein said at least a first optical element works in conjunction with the internal glazing surface to seal the building aperture and to encapsulate a still layer of air or other insulating gas to enhance a thermal integrity of the building aperture.

10. The optical system of claim 9, wherein the interior glazing surface is a flat surface or a curved surface having prismatic or diffusing elements formed therein for dispersing diffusive light around the interior of the building.

11. The optical system of claim 1, wherein said at least a first optical element is rotated by the rotation-imparting mechanism about an axis that is perpendicular to the first sheet and located at a center of said at least a first optical element.

12. The optical system of claim 1, wherein said at least a first optical element is a circular optical element and the building aperture is a circular aperture, and wherein the circular optical element fully protects the circular aperture against all incoming beam sunlight.

13. The optical system of claim 1, wherein said at least a first optical element is a circular optical element and the building aperture is a non-circular aperture, and wherein the circular optical element partially protects the non-circular aperture against incoming beam sunlight, while allowing beam sunlight to penetrate through unprotected parts of the non-circular aperture lying outside the circular optical element.

14. The optical system of claim 1, further comprising one or more surfaces for a low-E coating to help suppress thermal radiation transfer through a glazing assembly of the building aperture.

15. The optical system of claim 1, wherein the rotation-imparting mechanism is controlled to admit at least some amounts of beam sunlight into the interior of the building.

16. The optical system of claim 1, wherein the optical system comprises an optical-element sunshade system comprising a plurality of optical elements coupled to separate mounts that are rotated by the rotation-imparting mechanism.

17. The optical system of claim 16, wherein the optical-element sunshade system comprises a plurality of highly reflective surfaces, where adjacent highly reflective surfaces are separated from one another by daylight apertures that are covered with insulated glazing surfaces, and wherein diffuse skylight that is not incident on the optical elements passes through the insulated glazing surfaces and the daylight apertures into the interior of the building, and wherein beam sunlight that is not incident on the optical elements is incident on the plurality of highly reflective surfaces and is reflected by the plurality of highly reflective surfaces.

18. The optical system of claim 17, further comprising a protective exterior, the optical-element sunshade system being configured to be installed on a ceiling of the building.

19. The optical system of claim 16, wherein the optical-element sunshade system is configured for a circular aperture, and wherein the rotation-imparting mechanism comprises an Equatorial Mount to adjust a location of the optical-element sunshade system to shade the building aperture and to adjust an orientation of the optical-element sunshade system relative to the Sun based on a time of year so that a normal to a plane of the optical-element sunshade system points toward the Sun.

20. The optical system of claim 19, wherein the optical-element sunshade system slides along an Arc Beam to account for seasonal changes in a position of the Sun and rotates about an axis parallel to an Earth's rotational axis to account for diurnal changes in the position of the Sun.

* * * * *